(12) United States Patent
Usui et al.

(10) Patent No.: US 8,131,092 B2
(45) Date of Patent: Mar. 6, 2012

(54) PIXEL INPUT-OUTPUT METHOD, IMAGE COMPRESSING METHOD, PIXEL INPUT-OUTPUT APPARATUS, IMAGE COMPRESSING APPARATUS, IMAGE PROCESSING APPARATUS, IMAGE FORMING APPARATUS, COMPUTER PROGRAM AND RECORDING MEDIUM

(75) Inventors: Daisuke Usui, Tenri (JP); Hideyoshi Yoshimura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 526 days.

(21) Appl. No.: 12/426,557

(22) Filed: Apr. 20, 2009

(65) Prior Publication Data

US 2009/0263031 A1    Oct. 22, 2009

(30) Foreign Application Priority Data

Apr. 21, 2008 (JP) ................. 2008-110677

(51) Int. Cl.
*G06K 9/36* (2006.01)

(52) U.S. Cl. ........ 382/232; 382/176; 345/534; 345/555; 705/2

(58) Field of Classification Search .............. 382/176, 382/232; 345/534, 555; 705/2
See application file for complete search history.

(56) References Cited

U.S. PATENT DOCUMENTS

| | | | |
|---|---|---|---|
| 5,488,658 A * | 1/1996 | Hirashima | 380/215 |
| 5,671,299 A | 9/1997 | Oshida | |
| 6,389,162 B2 | 5/2002 | Maeda | |
| 6,633,576 B1 * | 10/2003 | Melaragni et al. | 370/412 |
| 6,701,012 B1 | 3/2004 | Matthews | |
| 7,015,975 B2 | 3/2006 | Miyaguchi et al. | |
| 7,158,669 B2 | 1/2007 | Tanaka et al. | |
| 2003/0016389 A1 * | 1/2003 | Miyaguchi et al. | 358/1.16 |
| 2003/0144828 A1 * | 7/2003 | Lin | 703/21 |

FOREIGN PATENT DOCUMENTS

| | | |
|---|---|---|
| JP | 4-310062 A | 11/1992 |
| JP | 7-320027 A | 12/1995 |
| JP | 9-289586 A | 11/1997 |
| JP | 10-193681 A | 7/1998 |
| JP | 2000-211196 A | 8/2000 |
| JP | 2001-239694 A | 9/2001 |
| JP | 2002-32749 A | 1/2002 |
| JP | 2002-94805 A | 3/2002 |
| JP | 2004-229261 A | 8/2004 |
| JP | 3779741 B2 | 5/2006 |

\* cited by examiner

*Primary Examiner* — Matthew Bella
*Assistant Examiner* — Eueng-Nan Yeh
(74) *Attorney, Agent, or Firm* — Birch, Stewart, Kolasch & Birch, LLP

(57) ABSTRACT

When inputted pixels from an input DMA unit, a packing unit outputs data package. One data package consists of α inputted pixels. A memory control unit writes, on a write line memory at a write interval, the data package that is outputted by the packing unit. The write interval is α times longer than an input interval at which the pixels are inputted into the packing unit. During the writing process, the memory control unit reads out another data package from a read line memory at a read interval that is the same as the input interval. In addition, the memory control unit treats the write line memory as the read line memory, after completing the writing process. Alternatively, the memory control unit treats the read line memory as the write line memory, after completing the reading process.

7 Claims, 23 Drawing Sheets

F I G. 3
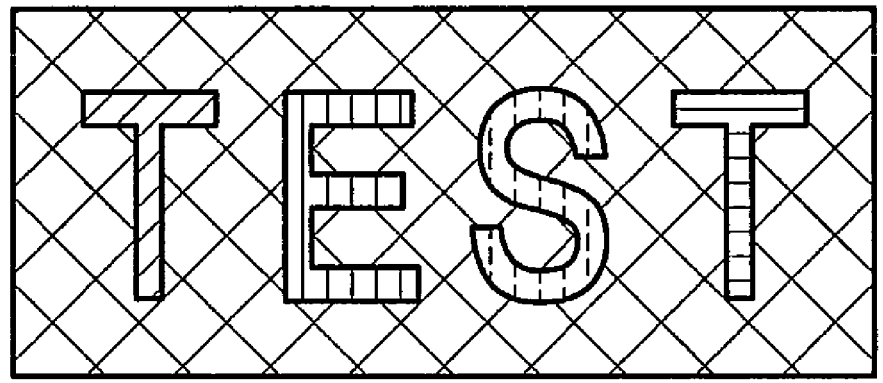
THIS IS A TEST IMAGE
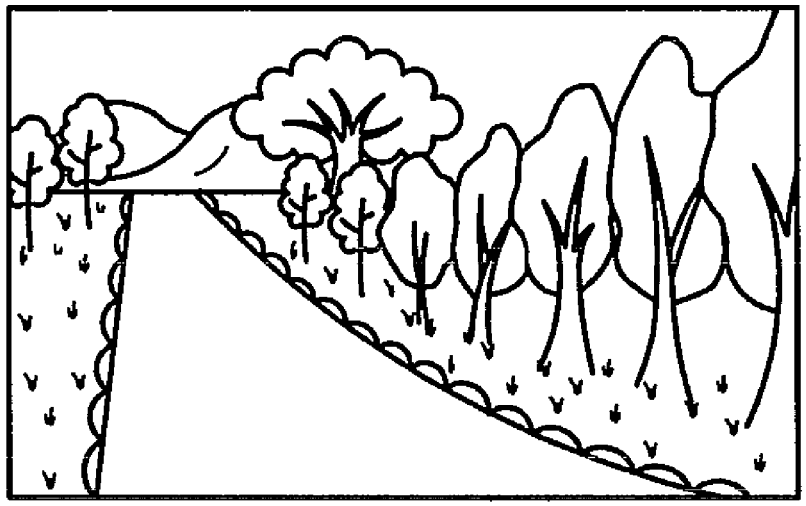

F I G. 4
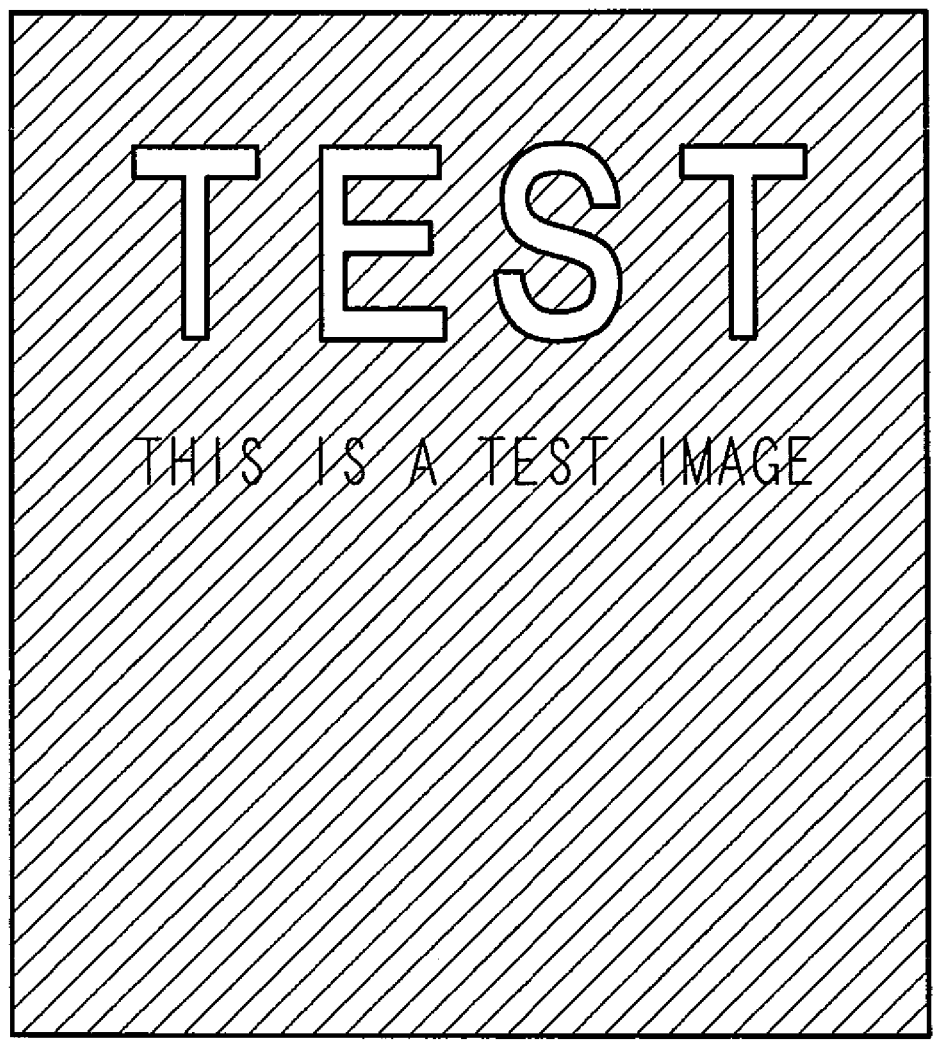

FIG. 6

| | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | ← L1 |
| 1 | 0 | 0 | 0 | 0 | 0 | 0 | 0 | 0 | 0 | 0 | 0 | 0 | 0 | 0 | 0 | 0 | ← L2 |
| 2 | 0 | 0 | 4 | 0 | 0 | 0 | 0 | 0 | 4 | 0 | 0 | 0 | 0 | 0 | 0 | 0 | ← L3 |
| 3 | 0 | 0 | 4 | 0 | 0 | 0 | 0 | 4 | 4 | 4 | 0 | 0 | 0 | 0 | 0 | 0 | ⋮ |
| 4 | 0 | 0 | 4 | 4 | 4 | 0 | 0 | 4 | 4 | 4 | 4 | 0 | 0 | 0 | 0 | 0 | |
| 5 | 0 | 0 | 4 | 4 | 4 | 0 | 0 | 4 | 4 | 4 | 4 | 0 | 0 | 0 | 0 | 0 | |
| 6 | 0 | 0 | 4 | 4 | 4 | 0 | 0 | 4 | 4 | 4 | 0 | 0 | 0 | 0 | 0 | 0 | |
| 7 | 0 | 0 | 0 | 0 | 4 | 0 | 0 | 0 | 4 | 0 | 0 | 0 | 0 | 0 | 0 | 0 | |
| 8 | 0 | 0 | 0 | 0 | 0 | 0 | 0 | 0 | 0 | 0 | 0 | 0 | 0 | 0 | 0 | 0 | |
| 9 | 0 | 0 | 0 | 0 | 0 | 0 | 0 | 0 | 0 | 0 | 0 | 0 | 0 | 0 | 0 | 0 | |
| 10 | 0 | 0 | 0 | 0 | 0 | 0 | 0 | 0 | 0 | 0 | 0 | 0 | 0 | 0 | 0 | 0 | |
| 11 | 0 | 0 | 0 | 0 | 0 | 0 | 0 | 0 | 0 | 0 | 0 | 0 | 0 | 0 | 0 | 0 | |
| 12 | 0 | 0 | 0 | 0 | 0 | 0 | 0 | 0 | 0 | 0 | 0 | 0 | 0 | 0 | 0 | 0 | |
| 13 | 0 | 0 | 0 | 0 | 0 | 2 | 2 | 2 | 0 | 0 | 0 | 0 | 0 | 0 | 3 | 3 | |
| 14 | 0 | 1 | 1 | 0 | 0 | 2 | 2 | 2 | 0 | 0 | 0 | 0 | 0 | 0 | 3 | 3 | |
| 15 | 0 | 1 | 1 | 0 | 0 | 0 | 2 | 0 | 0 | 0 | 0 | 0 | 0 | 0 | 3 | 3 | |
| 16 | 0 | 1 | 1 | 1 | 0 | 0 | 0 | 2 | 0 | 0 | 0 | 0 | 0 | 0 | 3 | 3 | |
| 17 | 0 | 1 | 1 | 0 | 0 | 0 | 0 | 0 | 2 | 0 | 0 | 0 | 0 | 0 | 3 | 3 | |
| 18 | 0 | 1 | 1 | 0 | 0 | 0 | 0 | 0 | 0 | 0 | 0 | 0 | 0 | 0 | 3 | 3 | ← L19 |
| 19 | 0 | 0 | 0 | 0 | 0 | 0 | 3 | 3 | 3 | 3 | 3 | 3 | 3 | 3 | 3 | 3 | ← L20 |

FIG. 7A

| IDENTIFIER | R | G | B |
|---|---|---|---|
| 0 | 255 | 255 | 255 |
| 1 | 0 | 255 | 0 |
| 2 | 0 | 255 | 255 |
| 3 | 255 | 0 | 0 |
| 4 | 128 | 0 | 128 |

FIG. 7B

| ADDRESS | IDENTIFIER | MINIMUM X COORDINATE VALUE | MAXIMUM X COORDINATE VALUE | MINIMUM Y COORDINATE VALUE | MAXIMUM Y COORDINATE VALUE | R | G | B | TOTAL NUMBER OF PIXEL |
|---|---|---|---|---|---|---|---|---|---|
| 0 | 0 | 0 | 15 | 0 | 19 | 255 | 255 | 255 | 248 |
| 1 | 1 | 1 | 3 | 14 | 18 | 0 | 255 | 0 | 11 |
| 2 | 2 | 5 | 8 | 13 | 17 | 0 | 255 | 255 | 9 |
| 3 | 3 | 6 | 15 | 13 | 19 | 255 | 0 | 0 | 22 |
| 4 | 4 | 2 | 11 | 2 | 7 | 128 | 0 | 128 | 30 |

FIG. 8

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 1 | 1 |
| 14 | 0 | 0 | 0 | 0 | 0 | 0 | 0 | 0 | 0 | 0 | 0 | 0 | 0 | 0 | 1 | 1 |
| 15 | 0 | 0 | 0 | 0 | 0 | 0 | 0 | 0 | 0 | 0 | 0 | 0 | 0 | 0 | 1 | 1 |
| 16 | 0 | 0 | 0 | 0 | 0 | 0 | 0 | 0 | 0 | 0 | 0 | 0 | 0 | 0 | 1 | 1 |
| 17 | 0 | 0 | 0 | 0 | 0 | 0 | 0 | 0 | 0 | 0 | 0 | 0 | 0 | 0 | 1 | 1 |
| 18 | 0 | 0 | 0 | 0 | 0 | 0 | 0 | 0 | 0 | 0 | 0 | 0 | 0 | 0 | 1 | 1 |
| 19 | 0 | 0 | 0 | 0 | 0 | 0 | 1 | 1 | 1 | 1 | 1 | 1 | 1 | 1 | 1 | 1 |

PIXEL INPUT-OUTPUT METHOD, IMAGE COMPRESSING METHOD, PIXEL INPUT-OUTPUT APPARATUS, IMAGE COMPRESSING APPARATUS, IMAGE PROCESSING APPARATUS, IMAGE FORMING APPARATUS, COMPUTER PROGRAM AND RECORDING MEDIUM

This Nonprovisional application claims priority under 35 U.S.C. §119(a) on Patent Application No. 2008-110677 filed in Japan on Apr. 21, 2008, the entire contents of which are hereby incorporated by reference.

BACKGROUND OF THE INVENTION

1. Field of the Invention

The present invention relates generally to an image processing method and an image processing apparatus, in particular, to pixel input-output method for inputting pixels into a memory or outputting pixels from the memory, an image compressing method for compressing a color image after separating a foreground image layer and a background image layer, a pixel input-output apparatus, an image compressing apparatus, an image forming apparatus, a computer program and a recording medium.

2. Description of Related Art

Digital image system has made rapid progress in recent years. As the digital image system progresses, construction of digital image processing technology is proceeded. For example, it is known that original documents are read by a scanner to generate digital files consisted of digital data, the generated digital files are reserved instead of the original documents, and the generated digital files are managed, in fields of copying machines with electrographic method or inkjet printing method, multi-function machines and the like. Furthermore, it is known that the generated digital files are compressed to be transmitted by e-mail.

Images obtained by scanners (scanned images) generally have large file sizes. Thus, it is required to compress the scanned images for accumulation or transmission.

In view of such situations, it is practical to use image compressing techniques based on separation of image layers, such as Mixed Raster Content (MRC), to compress such scanned images at high compression rate.

To generate a compressed image at high compression rate, the image compressing techniques based on separation of image layers firstly extract a foreground image mask representing a text and/or a line drawing from an original image to be compressed. On the basis of the extracted foreground image mask, the image compressing techniques then separate the original image into a foreground image layer and a background image layer. Each of the foreground image layer and the background image layer is finally compressed by a respective suitable compression way, to generate the compressed image at high compression rate (Japanese Patent Application Laid-Open No. 2002-94805, Japanese Patent No. 3779741).

The foreground image layer is an image layer for foreground representing a text and/or a line drawing, and is generally compressed by a lossless compression way, such as Joint Bi-level Image Group (JBIG), Modified Modified Read code (MMR), Lempel Ziv Welch (LZW), and the like.

On the other hand, the background image layer is an image layer for background representing image contents excluding a text and/or a line drawing, and is generally compressed by a lossy compression way, such as Joint Photographic Experts Group (JPEG), and the like.

The lossy compression ways are easy to control compression rate. Thus, image compressions can be performed by the lossy compression ways with priority to file size or image quality, in accordance with purposes of the compressed image. On the other hand, the lossless compression ways are difficult to control and increase compression rate.

In view of such difficulties, a conventional image compressing apparatus is known to further separate the foreground image layer that is separated from the original image (Japanese Patent Application Laid-Open No. 2004-229261). Thus, the conventional image compressing apparatus can compress the original image at higher compression rate by compressing the further separated foreground image layer, than by compressing directly the foreground image layer. In the conventional image compressing apparatus, one foreground image layer is generated by converting foreground colors of one original color image into $\beta$ types of identifier ($\beta$: positive integer). The generated foreground image layer is then separated into $\beta$ binary images. The separated binary images are respectively compressed.

Such conventional image compressing apparatus includes: a foreground image layer generating unit to generate the foreground image layer based on a color image; a binary image generating unit to generate the binary images in accordance with the foreground image layer; a binary image compressing unit to generate the compressed image by compressing the binary images; and an image memory to store at least one foreground image layer generated by the foreground image layer generating unit and $\beta$ binary images generated by the binary image generating unit.

To separate one foreground image layer into $\beta$ binary images, the foreground image layer is firstly read out and transmitted to the binary image generating unit. The binary image generating unit then generates one binary image among the $\beta$ binary images. The generated one binary image is transmitted and stored in the image memory. These processes are repeated $\beta$ times to obtain the $\beta$ binary images. Anyway, all the $\beta$ binary images are based on the same foreground image layer that is read out from the image memory and transmitted to the binary image generating unit.

An improvement is generally considered for efficient generation of the $\beta$ binary images in accordance with one foreground image layer, to store the foreground image layer transmitted from the image memory into a buffer of the binary image generating unit and to generate the $\beta$ binary images in accordance with the foreground image layer kept into the buffer. In this improvement, it is possible to reduce the numbers of transmission about the foreground image layer from the image memory to the binary image generating unit. In other words, the numbers of transmission are reduced from $\beta$ into one, because same foreground image layer is repeatedly ($\beta$ times) read out in the binary image generating unit. Thus, this improvement saves time required for inputting-outputting the foreground image layer and leads efficient generation of the binary images.

Additional buffer may be provided in the binary image generating unit to lead more efficient generation of the binary images.

Japanese Patent Application Laid-Open No. 2002-32749 discloses an image processing apparatus having line memories for image input and image output. In this image processing apparatus, images in the line memory for image input are firstly read out, n times faster than image input speed from image memory into the line memory for image input. The read out images are then performed image processings and written into the line memory for image output. The written images are finally outputted from the line memory for image output into the image memory, at the same speed as the image input speed. Thus, image processing speed can be performed at high speed in the image processing apparatus, even when images are transmitted at low speed outside the image processing apparatus.

Japanese Patent Application Laid-Open No. H7-320027 discloses another image processing apparatus including: plural image processing units; an image memory; and data bus control unit having a data packing function and a data unpacking function. In this image processing apparatus, images packed by the data bus control unit are stored in the image memory, and images unpacked by the data bus control unit are inputted into the image processing units. Thus, this image processing apparatus can save time required for inputting-outputting images, because packed images are transmitted to the image memory. In other words, this image processing apparatus can prevent a decrease in the processing rate when images are simultaneously inputted and outputted between each of the plural image processing units and the image memory.

SUMMARY OF THE INVENTION

The image processing apparatus disclosed by Japanese Patent Application Laid-Open No. 2002-32749 requires $\beta$ times faster clock rates internally, than those outside. Thus, a problem with this image processing apparatus is to increase circuit complexity for change of the clock rates.

The image processing apparatus disclosed by Japanese Patent Application Laid-Open No. H7-320027 is constructed to save time for inputting-outputting images into one image memory. However, this image processing apparatus is not constructed to bring efficient image inputting-outputting with plural image memories.

The present invention was made in view of such circumstances, and has a primary object to provide a pixel input-output method, an image compressing method, a pixel input-output apparatus, an image compressing apparatus, an image processing apparatus including the pixel input-output apparatus or the image compressing apparatus, an image forming apparatus including the image processing apparatus, a computer program to execute a computer as the image compressing apparatus, and a recording medium recorded the computer program, for efficiently inputting-outputting pixels with write memory and read memory, but without change of clock rates: by packing $\alpha$ pixels in a data package, among pixels inputted at an input interval ($\alpha$ is positive integer; $\alpha>1$); writing the data package into one memory at $\alpha$ times longer interval than the input interval; reading out, during the writing process, at the input interval another data package from the other memory having written another data package already.

In the pixel input-output method according to an aspect of the present invention, for example, the pixel input-output apparatus according to an aspect of the present invention includes the write memory and the read memory, inputs and outputs pixels for the memories. The write memory and the read memory may consist of plural storage devices. Alternatively, the write memory and the read memory may consist of plural memory regions separated from one memory region of one storage device. The pixel input-output apparatus preferably includes an image memory for storing images, and a transmission control unit for reading and transferring images stored in the image memory.

Furthermore, the pixel input-output apparatus according to an aspect of the present invention includes a packing means and a memory controlling means, in addition to the write memory and the read memory. When inputted pixels, the packing means outputs a data package that consists of $\alpha$ pixels generated by packing the inputted pixels ($\alpha$ is a positive integer; $\alpha>1$). For example, an image is firstly read out and transferred from the image memory by the transmission control unit. The packing means are then inputted pixels of the transferred image. The packing means finally outputs a data package that consists of $\alpha$ pixels generated by packing the inputted pixels of the transferred image.

The memory controlling means controls, for the write memory and the read memory, to write and read the data package. In particular, the memory controlling means writes on the write memory about the data package outputted by the packing means. The data packages are written at $\alpha$ times longer interval than the input interval at which $\alpha$ pixels are inputted into the packing means. In addition, the memory controlling means reads out another data package that has been outputted by the packing means, from the read memory that already has stored the "another data package". This data package is also read out and outputted at the input interval. Furthermore, the memory controlling means carries out writing process of data package on the write memory, during reading process of data package from the read memory.

As described above, the input interval of the pixel input-output method means a space of time between periods for inputting each $\alpha$ pixels into the packing means.

The data package is generated by packing $\alpha$ pixels. When inputted $\alpha$ pixels at the input interval, the packing means thus outputs one data package at an output interval that is $\alpha$ times longer than the input interval. For example, in the case that one pixel is sequentially inputted per second, it results in that one data package is written per $\alpha$ seconds on the write memory.

Therefore, when $\alpha$ pixels are inputted into the packing means, one data package is written on the write memory. At the same time, $\alpha$ data package are read out from the read memory. It should be noted that the number of data packages read out from the read memory may be less than $\alpha$. In these configurations, when $\alpha$ pixels are inputted into the packing means, it is possible to output from the read memory up to $\alpha$ data packages, i.e. $\alpha \times \alpha$ pixels. In other words, these configurations lead to increase substantial speed for inputting and outputting the pixels, up to $\alpha$ times.

Furthermore, these configurations do not require changing the input and output intervals of the pixels to be $\alpha$ times shorter, for substantially obtaining $\alpha$ times faster speed of inputting and outputting the pixels. In other words, these configurations do not require faster clock rates than those for inputting pixels into the packing means.

The memory controlling means controls to write data package on the write memory. When the data package has been written on the write memory, the memory controlling means treats this write memory as read memory. In addition, the memory controlling means controls to read out data package from the read memory. When the data package has been read out from the read memory, the memory controlling means treats this read memory as write memory. In other words, the write memory, as well as the read memory, is applied alternately for writing and reading. Furthermore, writing process can be performed during reading process. In other words, the writing process and the reading process can be performed in a concurrent manner. Therefore, these configurations lead advantages to improve efficiency for inputting and outputting pixels.

The pixel input-output apparatus preferably includes an image processing means for processing images in accordance with the data package outputted by the memory controlling means. In this case, it is not required to unpack the data package.

In the image compressing method according to an aspect of the present invention, the image compressing apparatus according to an aspect of the present invention includes the write memory and the read memory, separates a color image into a foreground image layer and a background image layer, and compresses the separated foreground image layer, as well as the separated background image layer. The write memory and the read memory may consist of plural storage devices. Alternatively, the write memory and the read memory may consist of plural memory regions separated from one memory region of one storage device. The image compressing apparatus preferably includes: an image memory to store the foreground image layer; and a transmission control unit to read out from the image memory and transfer a requested foreground image layer in response to a transmission request about foreground image layer, or to transfer onto the image memory and write an inputted foreground image layer.

Furthermore, the image compressing apparatus according to an aspect of the present invention includes a foreground image mask generating means, a table generating means, a foreground image layer generating means, a transmission request means, a packing means, a memory controlling means, a binary image generating means, and a binary image compressing means, in addition to the write memory and the read memory.

The foreground image mask generating means generates a foreground image mask based on a color image. The generated foreground image mask contains pixels for foreground representing a text and/or a line drawing of the color image.

The table generating means generates a table, based on the foreground image mask generated by the foreground image mask generating means and the color image. This table associates color information for the foreground of the color image with $\beta$ types of identifier for identifying the color information ($\beta$ is a positive integer). In other words, the generated table contains $\beta$ types of identifier that are corresponding to color information about not less than $\beta$ colors.

The foreground image layer generating means generates a foreground image layer, based on the table generated by the table generating means, the foreground image mask generated by the foreground image mask generating means and the color image. The generated foreground image layer is then outputted to the transmission control unit. In the generated foreground image layer, the color information for the foreground is converted to $\beta$ types of identifier.

The foreground image layer outputted by the foreground image layer generating means is inputted into the transmission control unit and then transferred to the image memory by the transmission control unit. The foreground image layer is finally written on the image memory.

The transmission request means requests to the transmission control unit about transmission of the foreground image layer. When requested the transmission of foreground image layer, the transmission control unit reads out from the image memory about the foreground image layer corresponding to the request, and transfers the read foreground image layer.

The packing means is inputted pixels of the foreground image layer that is transferred by the transmission control unit after being read out from the image memory. When inputted the pixels of the foreground image layer, the packing means outputs a data package that consists of $\alpha$ pixels generated by sequentially packing the inputted pixels of the foreground image layer ($\alpha$ is a positive integer; $\alpha>1$; $\alpha>\beta$ or $\alpha=\beta$).

The memory controlling means controls, for the write memory and the read memory, to write and read the data package. In particular, the memory controlling means writes on the write memory about the data package-outputted by the packing means. The data package is written at $\alpha$ times longer interval than the input interval at which pixels are inputted into the packing means. In addition, the memory controlling means reads out another data package that has been outputted by the packing means, from the read memory that has already stored the "another data package". This data package is read out and outputted at the input interval. This procedure of the reading process and the outputting process is repeated $\beta$ times. Furthermore, the memory controlling means carries out writing process of data package on the write memory, during reading process of data package from the read memory.

As described above, the input interval of the image compressing method means a space of time between periods for inputting each $\alpha$ pixels of the foreground image layer read out from the image memory by the transfer control unit, into the packing means.

The data package is generated by packing $\alpha$ pixels. When inputted $\alpha$ pixels at the input interval, the packing means thus outputs one data package at an output interval that is $\alpha$ times longer than the input interval. For example, in the case that one pixel is sequentially inputted per second into the packing means, it results in that one data package is written per $\alpha$ seconds on the write memory.

Therefore, when $\alpha$ pixels are inputted into the packing means, one data package is written on the write memory. At the same time, $\beta$ (up to $\alpha$) data packages are read out from the read memory. In these configurations, when $\alpha$ pixels are inputted into the packing means, it is possible to output from the read memory $\beta \times \alpha$ (up to $\alpha \times \alpha$) pixels. In other words, these configurations lead to increase $\beta$ times (up to $\alpha$ times) about the substantial speed for inputting and outputting the pixels.

Furthermore, these configurations do not require changing the input and output intervals of the pixels to be $\beta$ times shorter, for substantially obtaining $\beta$ times faster speed of inputting and outputting the pixels. In other words, these configurations do not require faster clock rates for inputting/outputting pixels for the write memory, the read memory, the packing means and the memory controlling means, than those for inputting pixels into the packing means.

The memory controlling means controls to write data package on the write memory. When the data package has been written on the write memory, the memory controlling means treats this write memory as read memory. In addition, the memory controlling means controls to read out data package from the read memory. When the data package has been read out from the read memory, the memory controlling means treats this read memory as write memory. In other words, the write memory, as well as the read memory, is applied alternately for writing and reading. Furthermore, writing process can be performed during reading process. In other words, the writing process and the reading process can be performed in a concurrent manner. Therefore, these configurations lead advantages to improve efficiency for inputting and outputting pixels.

The binary image generating means generates $\beta$ binary images, in accordance with the foreground image layer based on the data package outputted by the memory controlling means. Each of the $\beta$ binary images has only two possible values: one possible value is for pixels corresponding to one type of identifier; and the other possible value is for pixel corresponding to remaining types of identifiers. In other words, the binary image generating means carries out this binarization for respective β types of identifier. One data package is carried out of β time procedures about the reading process from the read memory and the inputting process into the binary image generating means. For example, a first data package is inputted into the binary image generating means. The binary image generating means then generates a binary image, based on the first data package. This binary image is for one data package corresponding to identifier "1". When inputted a second data package, the binary image generating means generates another binary image that is for one data package corresponding to identifier "2". When inputted the third data package, the binary image generating means generates another binary image that is for one data package corresponding to identifier "3". And then, when inputted βth data package, the binary image generating means generates another binary image corresponding to identifier "β". As the result, binary images for one data package is generated.

In other words, these configurations generate β binary images for one data package, and each of the β binary images is based on the same data package written on the line memory. Furthermore, these configurations do not require β time transmissions about the foreground image layer corresponding to a pixels, from the image memory to the binary image generating unit, for generating the β binary images. In addition, these configurations do not require unpacking the data package.

The binary image compressing means compresses each of the β binary images that are generated by the binary image generating means.

As described above, β represents a number of type of identifier, and α represents a number of pixel contained in one data package. The relationship between β and α is: β=α or β<α. Thus, it is possible to output β data packages from the read memory, in response to inputting one data package into the write memory. The reason is that it is possible to output up to α data packages from the read memory, in response to inputting one data package into the write memory.

The relationship between β and α is assumed to be: β>α. In this assumption, "β−α" data packages stay in the read memory after outputting α data packages from the read memory in response to inputting one data package into the write memory. In other words, the outputting speed cannot follow the inputting speed, in this assumption.

The image compressing apparatus according to an aspect of the present invention includes the write memory and the read memory, each of which consists of a line memory.

The memory controlling means repeats writing process onto the write line memory about the data package outputted by the packing means. This writing process is carried out at a writing interval, which is α times longer than the input interval. When data package for one line has been outputted from the packing means, the repeat of the writing process completes writing process onto the write line memory about another data package for one line. The write line memory is treated as the read line memory after completion of the writing process about data package.

In addition, the memory controlling means reads out from the read line memory that is already written another data package for one line outputted from the packing means, about this data package for one line. This reading process is carried out at a reading interval, which is the same as the input interval. The data package for one line is then transferred to the transmission control unit. The procedure of the reading process and the transferring process is repeated β times. The reading process of data package for one line is repeated up to α times because the relationship between β and α is: β=α or β<α.

When data package for one line has been written on the write line memory, another data package for one line is read out from the read line memory. This reading process is repeated β times, in response to writing one data package for one line. Thus, these configurations lead to increase β times about the substantial speed for reading and writing data package.

The binary image generating means generates β binary images, in accordance with the foreground image layer based on the data package for one line outputted by the memory controlling means. In other words, the generation process of the binary image is repeated β times. Each of the β binary images has only two possible values: one possible value is for pixels corresponding to one type of identifier; and the other possible value is for pixel corresponding to remaining types of identifiers. In other words, the binary image generating means carries out this binarization for respective β types of identifier. For example, a first data package for one line is inputted into the binary image generating means. The binary image generating means then generates a binary image, based on the first data package for one line. This binary image is for one line corresponding to identifier "1". When inputted a second data package for one line, the binary image generating means generates another binary image that is for one line corresponding to identifier "2". And then, when inputted βth data package for one line, the binary image generating means generates another binary image based on the βth data package for one line, for one line corresponding to identifier "β".

In other words, these configurations generate β binary images in response to one packed image for one line written on the line memory. It means that the set of β binary images is for one line. In addition, these configurations do not require β time transmissions about the foreground image layer for one line, from the image memory to the binary image generating unit, for generating the β binary images. Therefore, these configurations lead advantages to efficiently generate binary images with the use of two line memories.

The image processing apparatus according to an aspect of the present invention includes the pixel input-output apparatus, according to an aspect of the present invention, which is inputted pixels of images. Such pixels of images are firstly inputted, for example, through a scanning unit arranged on the image processing apparatus, a scanner connected to the image processing apparatus, a personal computer connected to the image processing apparatus, and the like.

In the pixel input-output apparatus according to an aspect of the present invention, it is possible to improve the efficiency for inputting and outputting pixels with the use of the write memory and the read memory, but without changing clock rates. Therefore, there are advantages to improve efficiency of image process by the image processing apparatus.

Another image processing apparatus according to an aspect of the present invention includes the image compressing apparatus, according to an aspect of the present invention, which is inputted color images. Such color images are firstly inputted, for example, through a color scanning unit arranged on the image processing apparatus, a color scanner connected to the image processing apparatus, a personal computer connected to the image processing apparatus, and the like.

In the image compressing apparatus according to an aspect of the present invention, it is possible to improve the efficiency for inputting and outputting pixels with the use of the write memory and the read memory, but without changing clock rates. Therefore, there are advantages to improve efficiency of image process by the image processing apparatus.

The image forming apparatus according to the present invention includes the image processing apparatus according to the present invention and an image forming means for forming images on a recording sheet.

In the image processing apparatus according to an aspect of the present invention, it is possible to improve the efficiency for inputting and outputting pixels with the use of the write memory and the read memory, but without changing clock rates. Therefore, there are advantages to improve efficiency of image process by the image forming apparatus.

The computer program according to the present invention implement, in software, to make hardware elements of computer behave like the packing means, memory controlling means and the like, included in the pixel input-output apparatus according to an aspect of the present invention.

Another computer program according to the present invention implement, in software, to make hardware elements of computer behave like the foreground image mask generating means, table generating means, foreground image layer generating means and the like, included in the image compressing apparatus according to an aspect of the present invention. This computer program may be combined with an image compressing procedure carried out by the image compressing apparatus, as a serial image processing program.

The recording medium according to the present invention stores computer executable program for processing data, the computer program when executed causes computer hardware elements to implement, in software, about the several means included in the pixel input-output apparatus and image compressing apparatus according to an aspect of the present invention. This recording medium may store computer executable program that is combined with an image compressing procedure carried out by the image compressing apparatus.

According to the pixel input-output method and the pixel input-output apparatus of the present invention, it is possible to write, at a writing interval which is α times longer than the input interval, on the write memory about the data package that consists of α pixels by packing inputted pixels. Furthermore, it is possible to read another data package from the read memory during writing the data package on the write memory, at a reading interval which is the same as the input interval. Therefore, there are advantages to improve the efficiency for inputting and outputting pixels with the use of the write memory and the read memory, but without changing clock rates.

According to the image compressing method and the image compressing apparatus of the present invention, it is possible to write, at a writing interval which is α times longer than the input interval, on the write memory about the data package that consists of α pixels of the foreground image layer by packing inputted pixels, as the foreground image layer is transferred by the transmission control unit. Furthermore, it is possible for binarization to read another data package from the read memory during writing the data package on the write memory, at a reading interval which is the same as the input interval. Therefore, there are advantages to improve the efficiency for generating binary images, through the improved efficiency for inputting and outputting pixels with the use of the write memory and the read memory, but without changing clock rates.

Furthermore, there are advantages to simplify circuit structure, because these configurations do not require an unpacking means for unpacking the data package.

According to the image processing apparatuses of the present invention, there are advantages to improve the efficiency for processing images, because the pixel input-output apparatus or the image compressing apparatus is included that can efficiently input and output pixels with the use of the write memory and the read memory, but without changing clock rates.

According to the image forming apparatus of the present invention, there are advantages to improve the efficiency for processing images, because the image processing apparatus is included that can efficiently input and output pixels with the use of the write memory and the read memory, but without changing clock rates.

According to the computer programs of the present invention, there are advantages to cause a computer system to execute steps, like as the pixel input-output apparatus or image compressing apparatus according to an aspect of the present invention.

According to the recording medium of the present invention, there are advantages to increase the convenience of delivery and save about the computer program that causes a computer system to execute steps, like as the pixel input-output apparatus or image compressing apparatus according to an aspect of the present invention, because the recording medium is recorded the computer program.

The above and further objects and features of the invention will more fully be apparent from the following detailed description with accompanying drawings.

BRIEF DESCRIPTION OF THE DRAWINGS

FIG. 3 is a schematic view showing an example of color image that is carried out a color image compressing process by the image compressing apparatus of Embodiment 1 according to an aspect of the present invention.

FIG. 4 is a schematic view showing an example of foreground image mask that is generated by the image compressing apparatus of Embodiment 1 according to an aspect of the present invention.

FIG. 6 is a diagrammatic illustration showing pixel values of the foreground image layer generated by the image compressing apparatus of Embodiment 1 according to an aspect of the present invention.

FIG. 7 shows examples of index color table generated by the image compressing apparatus of Embodiment 1 according to an aspect of the present invention.

FIG. 8 is a diagrammatic illustration showing pixel values of binary image for identifier "3" generated by the image compressing apparatus of Embodiment 1 according to an aspect of the present invention.

DESCRIPTION OF THE PREFERRED EMBODIMENTS

In the following, the present invention will be explained on the basis of drawings showing embodiments thereof.

Embodiment 1

Figure 1:
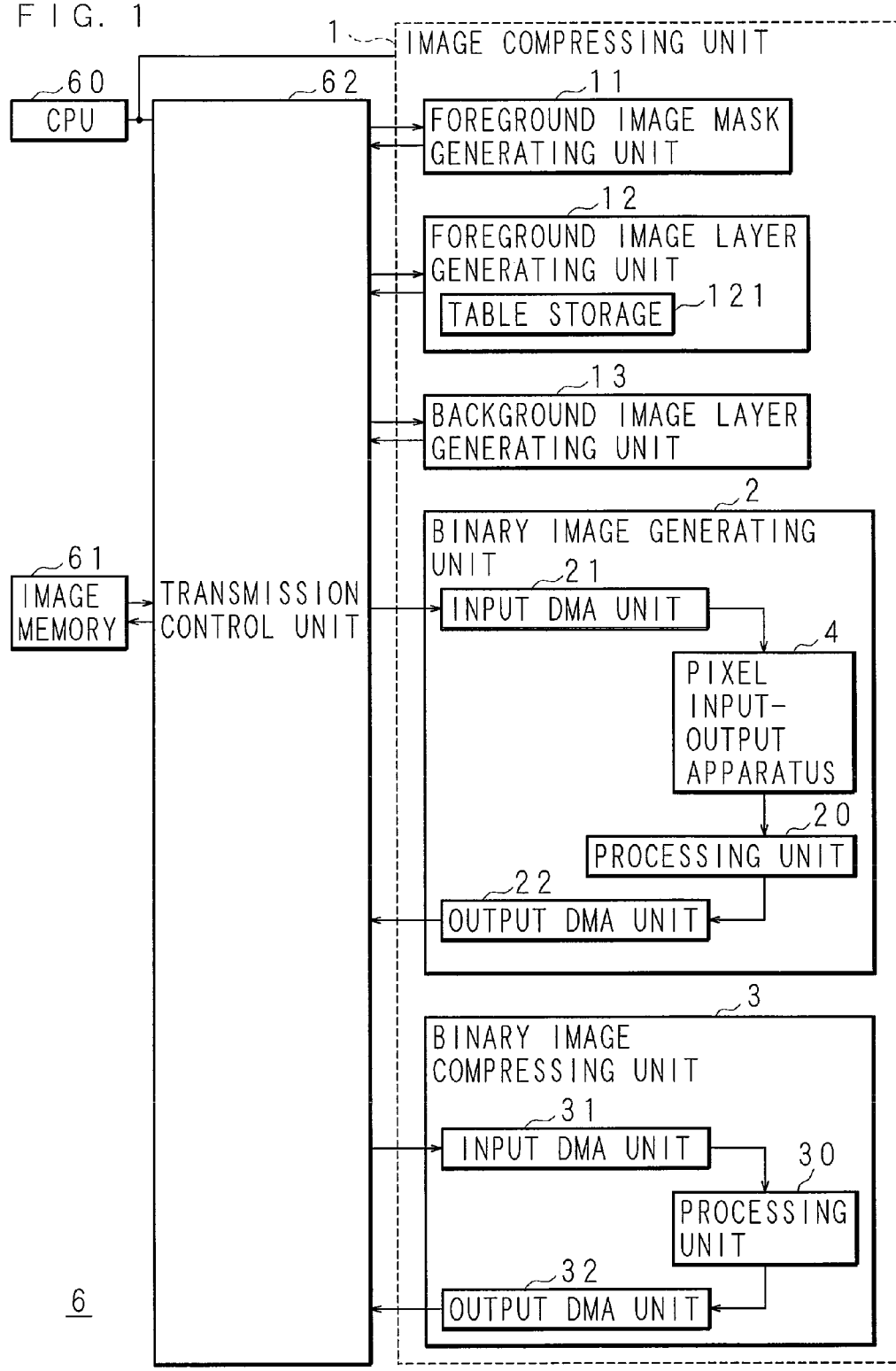
FIG. 1 is a block diagram showing configurations of main sections for an image compressing apparatus having a pixel input-output apparatus of Embodiment 1 according to an aspect of the present invention.
Figure 2:
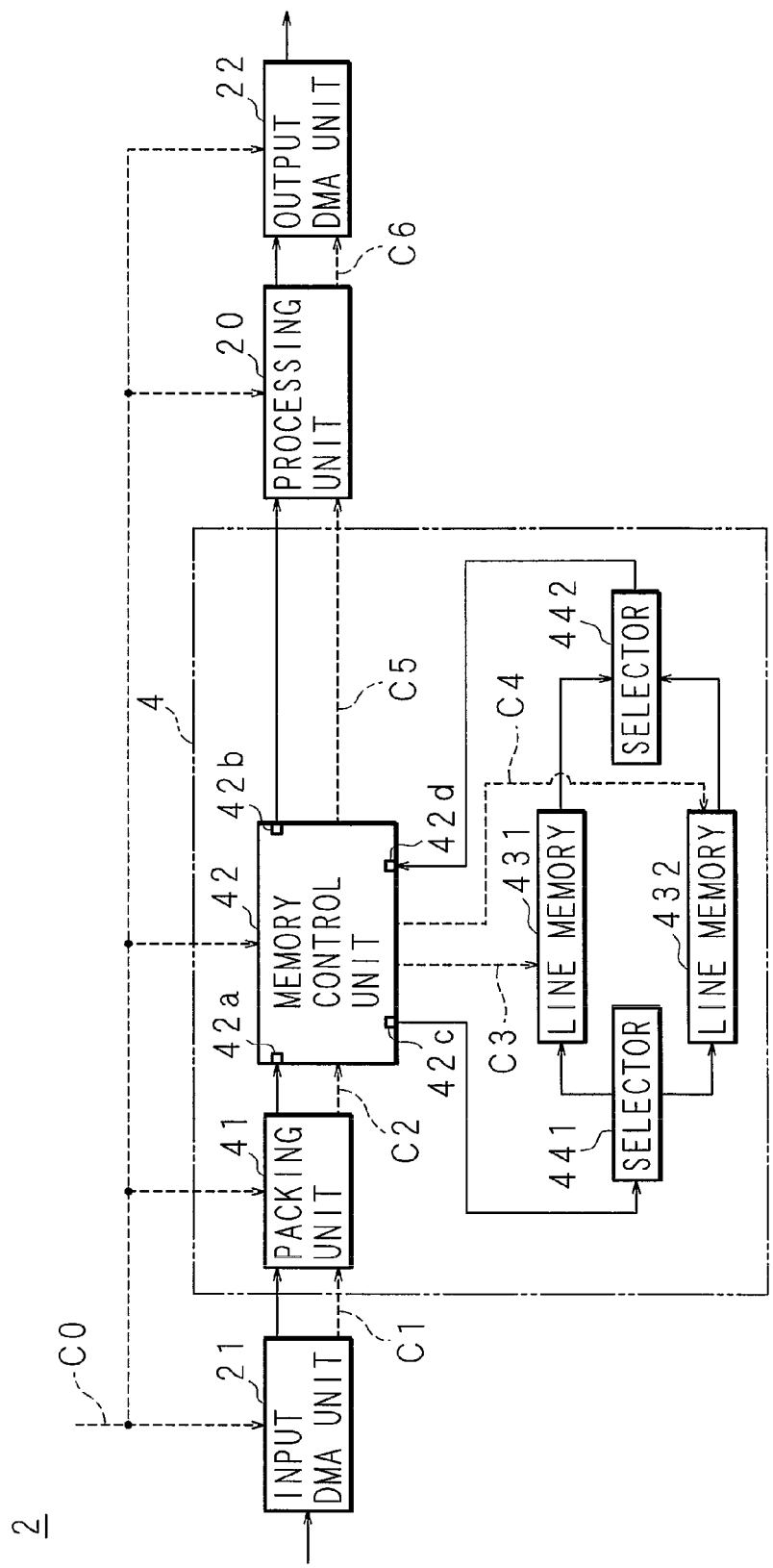
FIG. 2 is a block diagram showing configurations of main sections for the pixel input-output apparatus arranged in the image compressing apparatus of Embodiment 1 according to an aspect of the present invention.
Figure 5B:
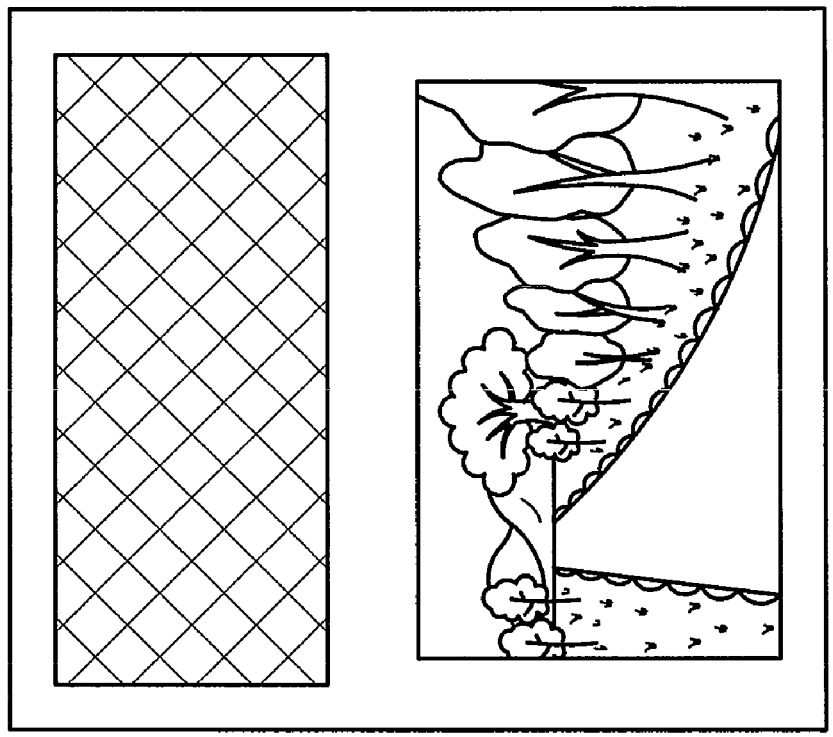
FIG. 5A and FIG. 5B are schematic views showing an example of foreground image layer and an example of background image layer that are generated by the image compressing apparatus of Embodiment 1 according to an aspect of the present invention.
Figure 5A:
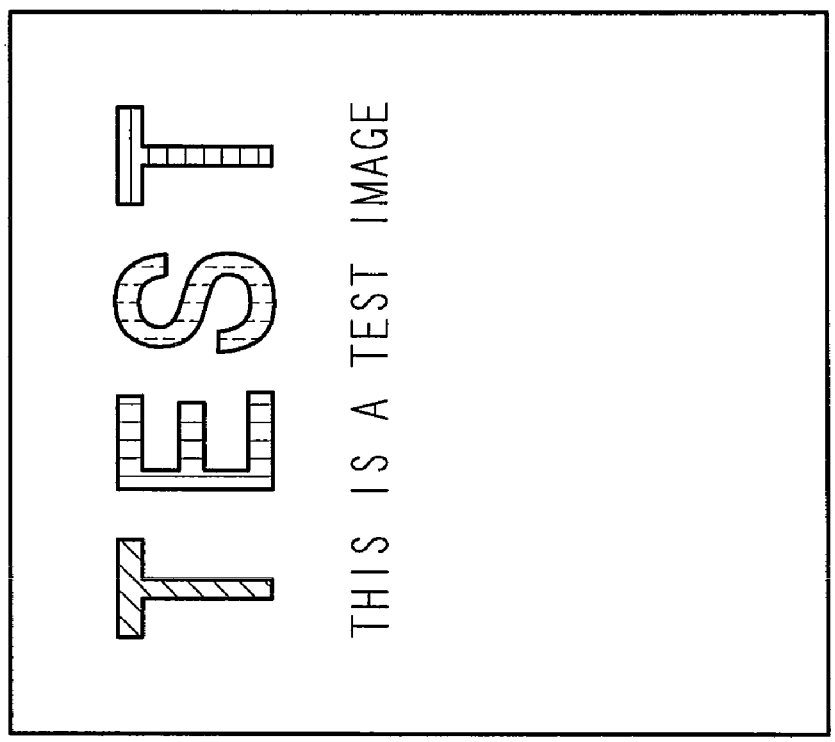

FIG. 1 is a block diagram showing configurations of main sections for an image compressing apparatus having a pixel input-output apparatus of Embodiment 1 according to an aspect of the present invention. FIG. 2 is a block diagram showing configurations of main sections for the pixel input-output apparatus arranged in the image compressing apparatus of Embodiment 1 according to an aspect of the present invention. FIG. 3 is a schematic view showing an example of color image that is subjected to a color image compressing process by the image compressing apparatus of Embodiment 1 according to an aspect of the present invention. FIG. 4 is a schematic view showing an example of foreground image mask that is generated by the image compressing apparatus. FIG. 5A and FIG. 5B are schematic views showing an example of foreground image layer and an example of background image layer that are generated by the image compressing apparatus.

In FIG. 1, numeral 6 represents the image compressing apparatus, which arranges: an image compressing unit 1; a central processing unit (CPU) 60; an image memory 61; and a transmission control unit 62.

The image compressing unit 1 arranges: a foreground image mask generating unit 11 that functions as a foreground image mask generating means; a foreground image layer generating unit 12 that functions as a table generating means and a foreground image layer generating means; a background image layer generating unit 13; a binary image generating unit 2 arranging a pixel input-output apparatus 4; and a binary image compressing unit 3 that functions as binary image compressing means. The foreground image layer generating unit 12 arranges a table storage 121 that consists of a resister, a RAM, or the like.

The binary image compressing unit 3 arranges: a processing unit 30; an input direct memory access (DMA) unit 31; and an output DMA unit 32.

As shown in FIG. 1 and FIG. 2, the binary image generating unit 2 further arranges: a processing unit 20 that functions as a binary image generating means; an input DMA unit 21 that functions as a transmission request means; and an output DMA unit 22, as well as the pixel input-output apparatus 4.

As shown in FIG. 2, the pixel input-output apparatus 4 arranges: a packing unit 41 that functions as a packing means; a memory control unit 42 that functions as a memory controlling means; two line memories 431, 432 that function as write and read memory; and two selectors 441, 442. The line memories 431, 432 are in a fast-in fast-out manner.

Solid arrows in FIG. 1 and FIG. 2 represent input-output directions of a color image, foreground image mask, foreground image layer, background image layer, binary image, or compressed image. Dashed arrows in FIG. 2 represent input-output directions of signals, such as clock rates or several control signals.

The CPU 60 is a control center of the image compressing apparatus 6 and gives several control signals to several parts of the image compressing unit 1. The several control signals represent: transfer timing for requesting transfer of a color image, a foreground image mask, or the like; an address for starting to write on the image memory 61 about a color image, a foreground image mask, or the like; generation timing for starting to generate a foreground image mask, a foreground image layer, or the like; input/output timing for inputting/outputting a data package (described later) into/from the line memories 431, 432; compress timing for starting to compress a binary image; and the like.

The image memory 61 consists of, for example, a Double-Data-Rate2 Synchronous Dynamic Random Access Memory (SDRAM) or a hard disk. Several data are written on the image memory 61, such as a foreground image mask, a foreground image layer, a background image layer, a binary image, a compressed image, each data outputted by each part (not shown) of the apparatus, and the like. In addition, such written data are read out from the image memory 61.

The transmission control unit 62 carries out a transferring process on a color image, foreground image mask, foreground image layer, binary image, compressed image, other various data or the like, in response to transfer request inputted into the transmission control unit 62. If plural transfer requests are inputted simultaneously, an order of priorities is determined for the inputted plural transfer requests. Then, the transmission control unit 62 sequentially carries out transferring processes, in accordance with the determined order of priorities.

For example, when the input DMA unit 21 requests transfer of a foreground image layer, the transmission control unit 62 reads out, from the image memory 61, a foreground image layer corresponding to the transfer request, and then transfers the read foreground image layer to the input DMA unit 21.

For example, when the output DMA unit 32 requests transfer of a compressed image, the transmission control unit 62 takes, from the output DMA unit 32, a compressed image corresponding to the transfer request, and then transfers the taken compressed image to the image memory 61.

The order of priorities for transfer requests may be set in the transmission control unit 62 by the CPU 60 at proper timing, or may be set as defaults in the transmission control unit 62.

FIG. 3 shows one color image, for the purpose of illustration.

This color image shown in FIG. 3 is formed on a white background with several colors of ink or toner, such as black, red, green, blue, purple and aqua. In this color image, a bold-faced text "TEST" is formed with respective colors: aqua, red, purple and blue. This "TEST" is written on a rectangle area that is solid colored with green. In addition, this color image has a light-faced text "THIS IS A TEST IMAGE" with black color and a landscape with various colors. In this color image, the text "TEST" and the text "THIS IS A TEST IMAGE" belong to a category of foreground image, and the rest of foreground image belong to another category of background image. In other words, the rectangle area that is solid colored with green, the landscape, and the area exposing white background belong to the category of background image.

Each pixel of such a color image has pixel values representing multi-valued color information to directly express various colors (e.g. 256 colors).

FIG. 4 shows one foreground image mask generated in accordance with the color image shown in FIG. 3, for the purpose of illustration.

The foreground image mask is configured from foreground pixels and background pixels. The foreground pixels have different pixel values from the background pixels.

In the foreground image mask shown in the FIG. 4, foreground is solid colored with white, and background is solid colored with black. Pixels representing such foreground image mask havi binary pixel values. For example, each pixel for a foreground has a pixel value "0", and each pixel for a background has a pixel value "1". Thus, it is easy to find pixels for foreground and pixels for background in the foreground image mask, by checking whether the pixel value of a given pixel is "0" or "1".

FIG. 5A shows an example of a foreground image layer generated in accordance with one color image shown in FIG. 3, one foreground image mask shown in FIG. 4 and an index color table (referred to as IC table to be described later).

A foreground of a foreground image layer is represented with colors contained in the foreground of a color image, while a background of the foreground image layer is represented with a color excluding the colors of the foreground. In the foreground image layer shown in FIG. 5A, a text "TEST" and a text "THIS IS A TEST IMAGE" are foreground. The text "TEST" is colored with aqua, red, purple, and blue. The text "THIS IS A TEST IMAGE" is colored with black. On the other hand, a background of the foreground image layer is colored with white.

It should be noted that a pixel value of pixel in the foreground image layer represents an identifier for indirectly expressing a few colors, while the pixel value of pixel in the color image represents color information for directly expressing multi colors.

For example, pixels of the foreground image layer have identifiers that are configured with multi values for expressing 8 colors, which are fewer than 256 colors of the color image. Each of 8 types of identifiers expressing 8 colors can be expressed with a pixel value having a data length of 3 bits. On the other and, each of the 256 types of color information for expressing 256 colors can be expressed with a pixel value having a data length of 8 bits. Thus, foreground image layer has less data amount than the color image.

In the foreground image layer, a pixel value of each foreground pixel represents one type of identifier among β types of identifier, while a pixel value of each background pixel represents one type of identifier other than the β types of identifier. The "β" is a positive integer, which is generally more than "1". The "β" may be "1". The identifiers and the color information are associated one on one with each other in the IC table (described later; see FIG. 7).

Each pixel of a foreground image layer has a pixel value presenting one type of identifier among β+1 types of identifier, because foreground of a color image has color information for β types of color in Embodiment 1. The foreground of a color images may have color information for more than β types of color. In this case, for example, red represents magenta, red-brown or the like which colors are close to red to restrict color information within β types of color. The IC table stores red that is a representative color, instead of magenta and red-brown.

Hereinafter, explanation will be given of a case that white is associated with an identifier "0", green with an identifier "1", aqua with an identifier "2", red with an identifier "3", purple with an identifier "4", blue with an identifier "5", . . . , black with an identifier "7". In other word, the one identifier "0" is background identifier, and the remaining identifiers, i.e. "1"-"7", are foreground identifiers.

Thus, the foreground image layer shown in FIG. 5A has pixels corresponding to foreground pixels of the color image shown in FIG. 3 with color information for aqua, and the corresponding pixels in the foreground image layer have identifiers "2". Similarly, the foreground image layer has pixels corresponding to foreground pixels of the color image with color information for red, and the corresponding pixels have identifiers "3". In the same manner, corresponding pixels for purple, blue and black have identifiers "4", "5" and "7".

On the other hand, the foreground image layer has pixels corresponding to background pixels of the color image, and the corresponding pixels have identifiers "0".

FIG. 5B shows an example of background image layer generated in accordance with one color image shown in FIG. 3, and one foreground image mask shown in FIG. 4.

The background image layer has a background expressed with colors contained in the background of the color image, and a foreground expressed with colors contained in the background. In other words, the foreground of the background image layer is configured by replacing (i.e. plugging) the colors of the foreground of the color image with colors of parts of the background in the vicinity of the foreground of the color image.

In the background image layer shown in FIG. 5B, the text "TEST" is expressed with green with which the rectangle area is solid colored, although the text "TEST" is colored with aqua, red, purple, and blue in the foreground of the color image shown in FIG. 3. Thus, the text "TEST" cannot be distinguished from the rectangle area that is solid colored with green. In addition, the text "THIS IS A TEST IMAGE" is colored with white in the background image layer, although the text "THIS IS A TEST IMAGE" is colored with black in the foreground of the color image shown in FIG. 3. Thus, the text "THIS IS A TEST IMAGE" cannot be distinguished from the white background.

Next, each part of the image compressing unit 1 will be explained.

The foreground image mask generating unit 11 is supplied with a color image transferred from the image memory 61 via the transmission control unit 62. Thus, the foreground image mask generating unit 11 shown in FIG. 1 generates one foreground image mask shown in FIG. 4, in accordance with a sheet of color image shown in FIG. 3.

The color image inputted into the foreground image mask generating unit 11 has Red Green Blue (RGB) values. For example, the color image is generated from a color image with RGB values obtained from an original document by a scanner (not shown) with predetermined image processes, such as analogue to digital conversion, shading correction, and the like.

When supplied with the color image, the foreground image mask generating unit 11 generates a foreground image mask having foreground pixels representing texts and/or line drawings contained in the color image, in accordance with the inputted color image, with the use of a method disclosed e.g. by the Japanese Patent No. 3779741. In this method, a derivative is carried out on a brightness value of each pixel of the color image, and a detection is carried out on edge portions whose brightness change brighter and edge portions whose brightness change darker. In accordance with the detection on the edge portions, a pixel value "0" is given to each pixel determined to belong to a foreground, and a pixel value "1" is given to each pixel determined to belong background.

The generated foreground image mask is outputted into the image memory 61 via the transmission control unit 62 and then stored in the image memory 61.

The foreground image layer generating unit 12 is supplied with the color image transferred from the image memory 61 and the foreground image mask respectively, via transmission control unit 62. Thus, the foreground image layer generating unit shown in FIG. 1 generates an IC table based on one color image shown in FIG. 3 and one foreground image mask shown in FIG. 4. The generated IC table is stored in the table storage 121. In addition, the foreground image layer generating unit 12 generates the foreground image layer shown in FIG. 5A, in accordance with one color image shown in FIG. 3, one foreground image mask shown in FIG. 4, and the IC table stored in the table storage 121. It should be noted the IC table is generated simultaneously with the foreground image layer.

Supplied with the color image and the foreground image mask, the foreground image layer generating unit 12 generates an IC table as well as a foreground image layer, in accordance with the inputted color image and foreground image mask, with the use of methods disclosed e.g. by the Japanese Patent Application Laid-Open No. 2002-94805 and No. 2004-229261. In these disclosed methods, when color information of foreground pixels have not been stored in the IC table yet, new identifiers are firstly given to the color information. Then, the color information and the given identifiers are stored in the IC table. The color information of the foreground pixels are finally replaced with the given identifiers. On the other hand, when color information of foreground pixels have already been stored in the IC table, the color information of the foreground pixels are replaced with the identifiers that have been already stored in the IC table. In addition, color information of each background pixel is uniformly replacesd with a predetermined identifier.

The foreground image layer generated by the foreground image layer generating unit 12 is outputted into the image memory 61 via the transmission control unit 62, and then stored in the image memory 61.

The foreground image layer generating unit 12 is supplied by the CPU 60, in advance, with an address of a storage area for storing the foreground image layer in the image memory 61 (i.e. start address representing a position to start writing the foreground image layer). Thus, the foreground image layer is written from a position of the image memory 61 where the start address represents.

The IC table generated by the foreground image layer generating unit 12 stores at least the color information contained in the foreground of the color image and D types of identifier for identifying the color information, in association to one another. In Embodiment 1, the color information are represented by integers from "0" to "255" for R, G and B values, respectively. The identifiers are represented by integers from "0" to "7".

Hereinafter, the IC table will be explained with a specific example.

FIG. 6 is a diagrammatic illustration showing pixel values of the foreground image layer generated by the image compressing apparatus of Embodiment 1 according to an aspect of the present invention. In addition, the diagrammatic illustration shows one foreground image layer, and coordinate values in X and Y directions of this foreground image layer. In Embodiment 1, a forward direction of the X axis is a main scanning direction for e.g. a color image and a foreground image layer, and a forward direction of the Y axis is a sub scanning direction.

FIG. 7 shows examples of index color table generated by the image compressing apparatus of Embodiment 1 according to an aspect of the present invention. IC tables are shown in FIG. 7. Each IC table corresponds to the foreground image layer shown in FIG. 6.

The IC table in FIG. 7A stores identifiers and R, G and B values of color information, in association with each other.

In the foreground image layer shown in FIG. 6, X coordinate values of pixels are integers from "0" to "15", Y coordinate values of pixels are integers from "0" to "19", and total pixel number is "320 (=16×20)".

As shown in FIG. 6 and FIG. 7A, the foreground image layer has foreground pixels: 11 pixels with identifier "1" corresponding to green (R, G, B=0, 255, 0); 9 pixels with identifier "2" corresponding to aqua (R, G, B=0, 255, 255); 22 pixels with identifier "3" corresponding to red (R, G, B=255, 0, 0); and 30 pixels with identifier "4" corresponding to purple (R, G, B=128, 0, 128). In other words, the number of types of identifier β=4 in the foreground image layer.

In addition, the foreground image layer has 248 background pixels with identifier "0" corresponding to white (R, G, B=255, 255, 255).

It should be noted that the IC table is not limited to the one shown in FIG. 7A. For example, the image compressing apparatus may generate the IC table shown in the FIG. 7B. The IC table shown in FIG. 7B stores: identifiers; addresses; maximum and minimum X coordinate values in X axis direction of pixels representing color information; maximum and minimum Y coordinate values in Y axis direction of pixels representing color information; and total number of pixel representing color information, as well as R, G, and B values of color information is association to one another. The addresses here mean the addresses of table storage 121 storing identifiers.

For pixels with identifier "1", the minimum X coordinate value is "1", the maximum X coordinate value is "3", the minimum Y coordinate value is "14", and the maximum Y coordinate value is "18". For pixels with identifier "2", the minimum X coordinate value is "5", the maximum X coordinate value is "8", the minimum Y coordinate value is "13", and the maximum Y coordinate value is "17". For pixels with identifier "3", the minimum X coordinate value is "6", the maximum X coordinate value is "15", the minimum Y coordinate value is "13", and the maximum Y coordinate value is "19". For pixels with identifier "4", the minimum X coordinate value is "2", the maximum X coordinate value is "11", the minimum Y coordinate value is "2", and the maximum Y coordinate value is "7".

Color information for each pixel may be represented by CIE 1976 standard colorimetric system with L*, a* and b* (Commission Internationale de l'Eclairage: L* means lightness; a* means redness; and b* mean yellowness) or YCrCb color system (Y means brightness; Cr and Cb mean chrominance), instead of being represented by values of RGB color space.

The background image layer generating unit 13 is supplied with a color image transferred from the image memory 61 and a foreground image mask respectively, via the transmission control unit 62. Thus, the background image layer generating unit 13 shown in FIG. 1 generates the background image layer shown in the FIG. 5B, in accordance with the one color image shown in FIG. 3 and a sheet of foreground image mask shown in FIG. 4.

Supplied with the color image and the foreground image mask, the background image layer generating unit 13 generates the background image layer based on the supplied color image and foreground image mask, with the use of methods disclosed e.g. by the Japanese Patent Application Laid-Open No. 2002-94805 and No. 2004-229261. In these disclosed methods, foreground pixels are plugged with pixel values of background pixels in the vicinity of the parts of foreground pixels. When background pixels are not present in the vicinity of foreground pixels, in other words, when only foreground pixels are present around foreground pixels, the foreground pixels are plugged with pixel values of the foreground pixels which have already been plugged. One pixel may be plugged with one pixel value, or may be plugged with one average value of plural pixel values.

The generated background image layer is outputted to the image memory 61 via the transmission control unit 62, and then stored in the image memory 61.

As described above, the foreground image layer and the background image layer are generated by separating the color image into a region representing foreground and a region representing background.

The image compressing unit 1 arranges a background image layer compressing unit (not shown) that is supplied with the background image layer transferred from the image memory 61 via the transmission control unit 62. Then, the background image layer compressing unit compresses the supplied background image layer with the use of a known lossy compression technique, and outputs the compressed background image layer to the image memory 61 via the transmission control unit 62.

On the other hand, the foreground image layer is compressed with the use of lossless compression techniques. For improving compression rates, one foreground image layer should be further separated and then compressed. Thus, one foreground image layer is separated into β binary images by the binary image generating unit 2. The β binary images corresponds to β types of identifier. Each of the β binary images is compressed with the use of the lossless compression technique by the binary image compressing unit 3.

Figure 9:
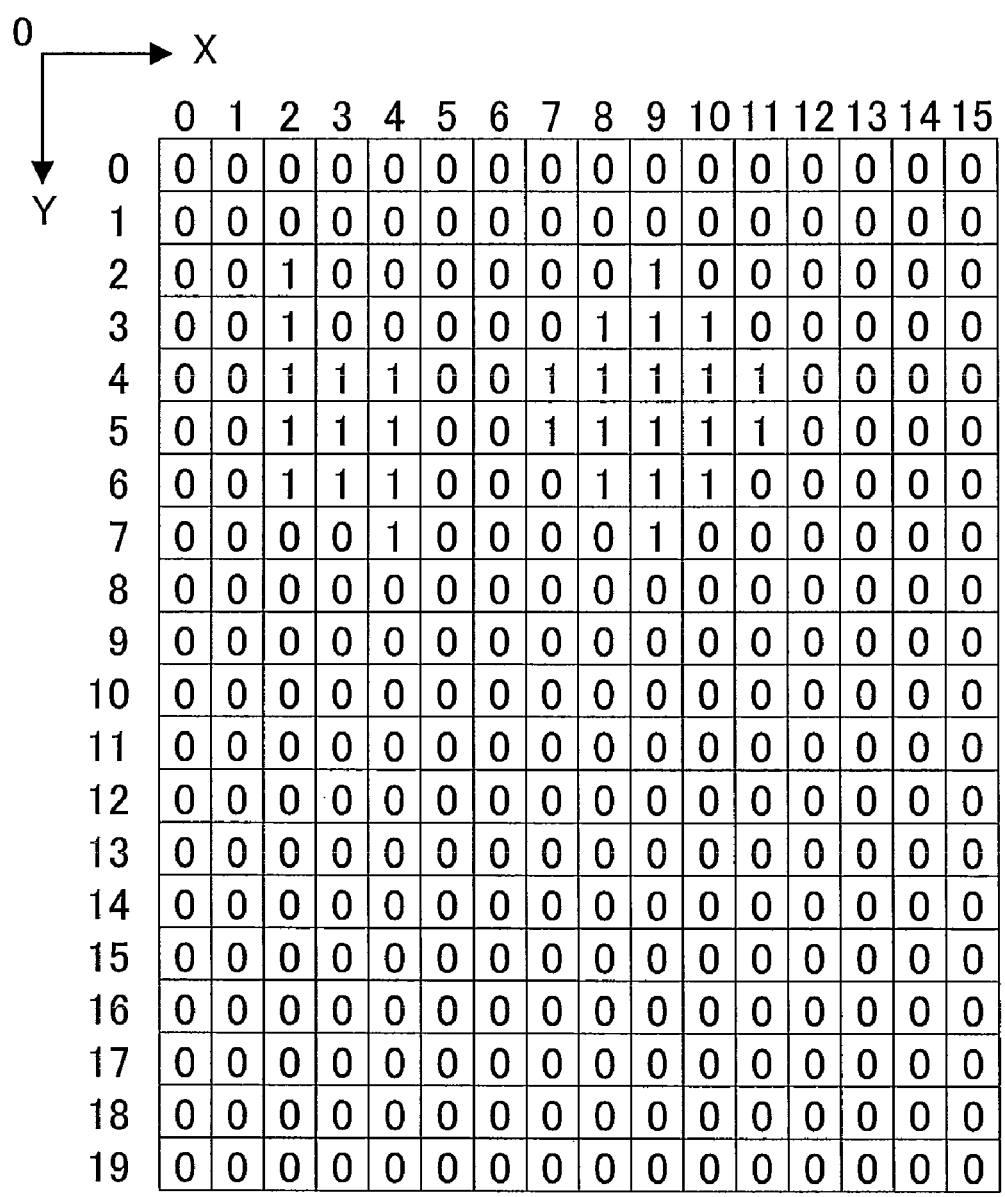
FIG. 9 is a diagrammatic illustration showing pixel values of binary image for identifier "4" generated by the image compressing apparatus of Embodiment 1 according to an aspect of the present invention.

FIG. 8 and FIG. 9 are diagrammatic illustrations showing pixel values of binary images for identifier "3" and "4" generated by the image compressing apparatus of Embodiment 1 according to an aspect of the present invention. Binary images for identifiers "1" and "2" are not shown.

As shown in FIG. 8, the binary image for identifier "3" has pixels that are configured by converting pixel values of the pixels for identifier "3" of the foreground image layer shown in FIG. 6 into "1" and the remaining pixel values into "0".

As shown in FIG. 9, the binary image for identifier "4" similarly has pixels that are configured by converting pixel values of the pixels for identifier "4" of the foreground image layer shown in FIG. 6 into "1" and the remaining pixel values into "0".

The binary image generating unit 2 generates binary images for identifier "1" and "2" (not shown), as well as the binary images for identifier "3" and "4" shown in FIG. 8 and FIG. 9, based on the foreground image layer shown in FIG. 6. In other words, one foreground image layer shown in FIG. 6 is separated into 4 binary images corresponding to 4 types of identifiers, by the binary image generating unit 2. These 4 binary images for identifiers "1" to "4" are respectively compressed by the binary image compressing unit 3.

Explanation will be given of configuration and operation of the binary image generating unit 2.

As shown in FIGS. 1 and 2, the binary image generating unit 2 arranges the input DMA unit 21 whose input side is connected to the transmission control unit 62 and output side is connected to an input side of the pixel input-output apparatus 4. An output side of the pixel input-output apparatus 4 is connected to an input side of the processing unit 20.

An output side of the processing unit 20 is connected to an input side of the output DMA unit 22. An output side of the output DMA unit 22 is connected to the transmission control unit 62.

In further detail, as shown in FIG. 2, the pixel input-output apparatus 4 arranges: the input DMA unit 21 whose output side is connected to an input side of the packing unit 41; the packing unit 41 whose output side is connected to a first input unit 42a of the memory control unit 42; and the memory control unit 42 whose first output unit 42b is connected to the input side of the processing unit 20.

The memory control unit 42 arranges a second output unit 42c that is connected to each input side of the line memories 431, 432 via selector 441. Each output side of the line memories 431, 432 is connected to a second input unit 42d of the memory control unit 42 via the selector 442.

As shown by dashed arrows C0 in FIG. 2, a clock outputted by a clock generator (not shown) outside of the binary image generating unit 2 is inputted into the input DMA unit 21, packing unit 41, memory control unit 42, processing unit 20, and output DMA unit 22, respectively.

When supplied with a control signal representing transfer timing for requesting transfer of a foreground image layer by the CPU 60, the input DMA unit 21 of the binary image generating unit 2 requests to transfer a foreground image layer from the transmission control unit 62. The input DMA unit 21, which is supplied with a start address of a foreground image layer in advance, requests the transmission controlling unit 62 to read out data starting at the position represented by the start address.

The foreground image layer is read out form the image memory 61, transferred via the transmission control unit 62, and inputted into the input DMA unit 21. For the inputting, a part for one line of the transferred foreground image layer is sequentially inputted into the input DMA unit 21.

The input DMA unit 21 repeatedly outputs, into the packing unit 41, the part for one line of the foreground image layer that is sequentially inputted, until the one foreground image layer has been completely transferred. When one clock is inputted, the input DMA unit 21 outputs, to the packing unit 41, one pixel of the part for one line of the foreground image layer, in synchronization with the inputted clock.

As for the foreground image layer shown in FIG. 6, the input DMA unit 21 outputs into the packing unit 41 about the part for one line of the foreground image layer which includes pixels having X coordinate values from "0" to "15". The input DMA unit 21 repeats the outputting process of such part for one line of the foreground image layer, from the line for Y coordinate value "0" to the line for Y coordinate value "19" in order. As the results of the repeating, one foreground image layer is given to the packing unit 41.

In further detail, the input DMA unit 21 firstly starts the outputting process of the line for Y coordinate value "0" (referred to as "first line L1", hereinafter). As for the first line L1, the input DMA unit 21 outputs to the packing unit 41, a pixel for X coordinate value "0" in response to one clock inputted into the input DMA unit 21. Similarly, the input DMA unit 21 sequentially outputs a pixel for X coordinate value "1", a pixel for X coordinate value "2", . . . , and a pixel for X coordinate value "15", every time one clock is inputted. Then, the input DMA unit 21 starts the outputting process of the line for Y coordinate value "1" (call "second line L2", hereinafter). As for the second line L2, the input DMA unit 21 outputs 16 pixels to the packing unit 41, in the same manner as for the first line L1. About the lines for Y coordinate value "2" to "18", similar processes are carried out. Finally, the input DMA unit 21 outputs, to the packing unit 41, 16 pixels of the line for Y coordinate value "19" (referred to as "20th line L20", hereinafter).

As shown by a dashed arrow C1 in FIG. 2, the input DMA unit 21 further outputs, to the packing unit 41, an input data sub-scanning control signal C11 and an input data main-scanning control signal C12 (see FIG. 11 described later). The outputting process of pixels from the input DMA unit 21 to the packing unit 41 is carried out, every time the input data sub-scanning control signal C11 and input data main-scanning control signal C12 are outputted.

The input data sub-scanning control signal 11I is continuously outputted from the input DMA unit 21, during the time when outputted pixels are based on the same one foreground image layer. When the outputting process of pixels based on one foreground image layer has been completed, the outputting process of the input data sub-scanning control signal C11 is stopped by the input DMA unit 21.

On the other hand, the input data main-scanning control signal C12 is continuously outputted from the input DMA unit 21, during the time when outputted pixels are based on the same part for one line of foreground image layer. When the outputting process of pixels based on the part for one line of foreground image layer has been completed, the outputting process of the input data main-scanning control signal C12 is stopped by the input DMA unit 21. Thus, the input data main-scanning control signal C12 is outputted ω times, during the outputting process of the input data sub-scanning control signal C11. The number "ω" is equal to the number of lines for one foreground image layer. As for the foreground image layer shown in FIG. 6, ω is 20.

When supplied with one foreground image layer shown in FIG. 6, the input DMA unit 21 outputs, to the packing unit 41, the input data sub-scanning control signal C11. The input DMA unit 21 further outputs to the packing unit 41 about the input data main-scanning control signal C12.

The input DMA unit 21 outputs to the packing unit 41 sequentially about 16 pixels for the first line L1 respectively, in synchronization with clocks, during the outputting process of first input data main-scanning control signal C12 to the packing unit 41. When the input DMA unit 21 has completed to output the 16 pixels for the first line L1, the outputting process of the first input data main-scanning control signal C12 is stopped.

Then, the input DMA unit 21 outputs to the packing unit 41 sequentially 16 pixels for the second line L2, in synchronization with clocks, during the outputting process of second input data main-scanning control signal C12 to the packing unit 41. When the input DMA 21 has completed to output the 16 pixels for the second line L2, the outputting process of second input data main-scanning control signal C12 is stopped.

Similarly, the input DMA unit 21 repeatedly outputs the input data main-scanning control signal C12 and 16 pixels, for other lines (from the third line L3 to 19th line L19).

Finally, the input DMA unit 21 outputs, to the packing unit 41, 16 pixels for the 20th line L20, in synchronization with clocks, during the outputting process of a 20th input data main-scanning control signal C12 to the packing unit 41. When the input DMA 21 has completed to output the 16 pixels for the 20th line L20, the outputting process of 20th input data main-scanning control signal C12 is stopped. Furthermore, the outputting process of input data sub-scanning control signal C11 is stopped.

The packing unit 41 is supplied with the input DMA unit 21 with pixels of a foreground image layer transferred from the image memory 61, generates package data by sequentially packing α pixels that are inputted into the packing unit 41, and outputs the generated package data to the memory control unit 42. The number "α" representing the number of packed pixels P, P, . . . is a positive integer, α>1, and α>β or α=β. In the Embodiment 1, it will be explained with the case: α=β=4, for purpose of illustration.

Supplied with α pixels, the packing unit 41 generates one data package with the data packing process carried out on the inputted α pixels, and outputs the generated data package to the memory control unit 42, in synchronization with a clock. Thus, the data package is outputted from the packing unit 41 to the memory control unit 42 at an interval that is α times longer than the input interval for inputting pixels into the packing unit 41.

Figure 10:
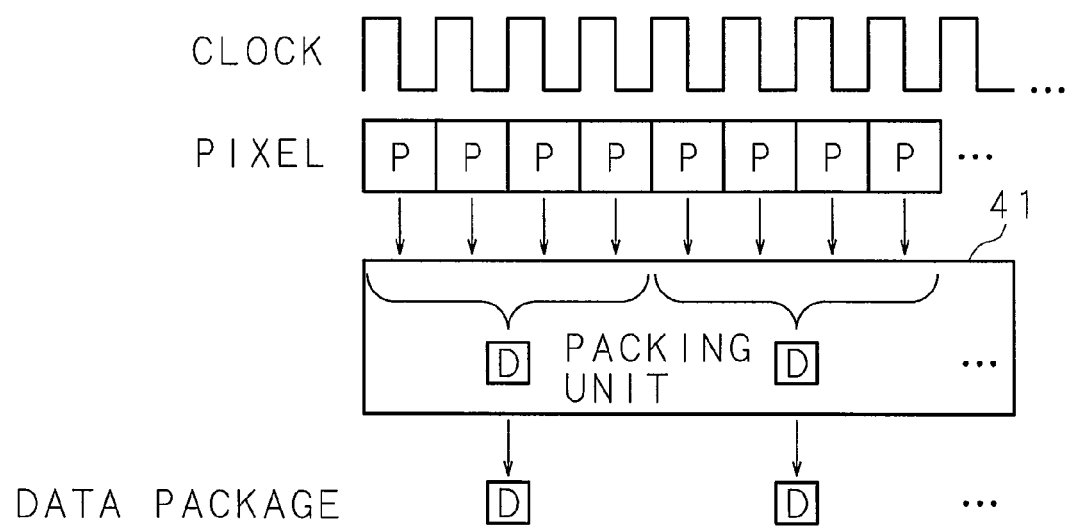
FIG. 10 is a schematic view showing inputting and outputting about pixels and data package in a packing unit of the image compressing apparatus of Embodiment 1 according to an aspect of the present invention.

FIG. 10 is a schematic view showing inputting and outputting pixels and data packages in the packing unit of the image compressing apparatus of Embodiment 1 according to an aspect of the present invention.

As shown in FIG. 10, one pixel P is outputted from the input DMA unit 21 in response to one clock, and then inputted into the packing unit 41. Thus, when four clocks are given to the input DMA unit 21, four pixels P, P, . . . , are inputted into the packing unit 41.

Then, the packing unit 41 generates one data package D with the data packing process carried out on the inputted four pixels P, P, . . . , and outputs the generated data package D to the memory control unit 42, in synchronization with a clock.

As for the foreground image layer shown in FIG. 6, a part for one line of foreground image layer contains 16 pixels P, P, . . . . Thus, 4 data packages D, D, . . . are outputted, to the packing unit 41, 16 pixels P, P, . . . contained in one line of foreground image layer.

Furthermore, this foreground image layer contains 20 lines L1, L2, . . . , L20. Thus, there are 320 pixels P, P, . . . , for one foreground image layer. Therefore, 80 data packages D, D, . . . are outputted by the packing unit 41.

The data packages D, D, . . . outputted by the packing unit 41 are inputted into the memory control unit 42 via the first input unit 42a.

In Embodiment 1, the number of pixels contained in the part for one line of the foreground image layer can be divided by the number "α" of the data packages, and each data package D is configured from 4 pixels P, P, . . . contained in the foreground image layer. If the number of pixels contained in the part for one line of the foreground image layer cannot be divided by the number "α" of the data packages, the packing unit 41 generates meaningless pixels and generates each data package D that is configured from 4 pixels with the use of pixels P, P, . . . contained in the foreground image layer and generated meaningless pixels. In other words, one data package D is configured with pixels P, P, . . . (from 1 to 3) contained in the foreground image layer and the meaningless pixels (from 3 to 1).

The meaningless pixels of the data package D are excluded, for example, by the binary image compressing unit 3.

In Embodiment 1, the number "α" of the data packages is equal to the number "β" of the types of the identifier contained in the foreground image layer shown in FIG. 6. Preferably, the number "α" of the data packages may be equal to an upper limit "n" of the number of types of the identifier used by the image compressing apparatus 6: i.e., α=n>β, or α=n=β.

Figure 11:
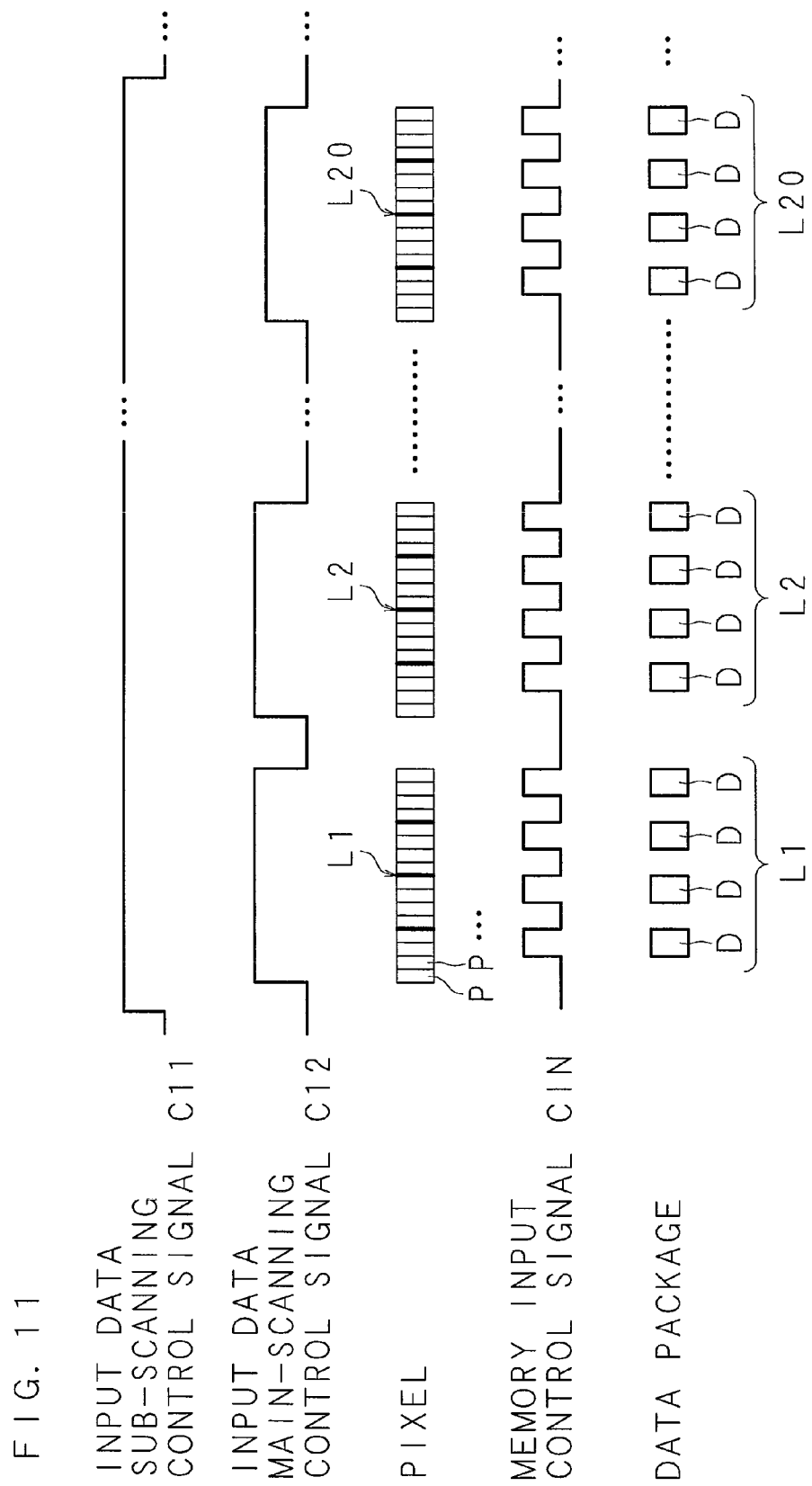
FIG. 11 is a timing diagram showing input timing of several control signals into the packing unit and a line memory arranged in the image compressing apparatus of Embodiment 1 according to an aspect of the present invention.
Figure 12:
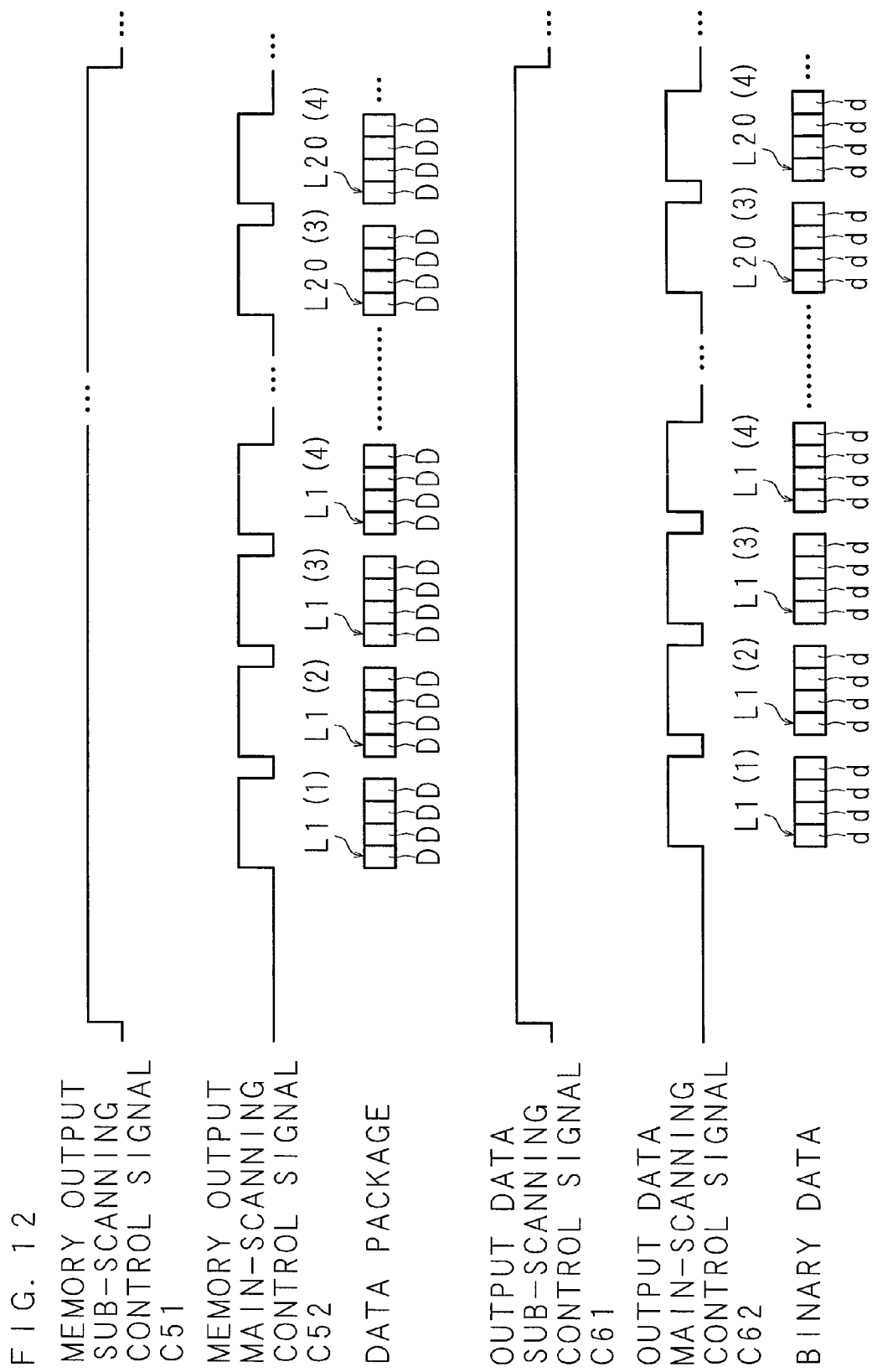
FIG. 12 is a timing diagram showing input timing of several control signals into a processing unit and an output DMA unit arranged in the image compressing apparatus of Embodiment 1 according to an aspect of the present invention.

FIG. 11 is a timing diagram showing input timing of several control signals into the packing unit and the line memory arranged in the image compressing apparatus of Embodiment 1 according to an aspect of the present invention. FIG. 12 is a timing diagram showing input timing of several control signals into the processing unit and the output DMA unit arranged in the image compressing apparatus of Embodiment 1 according to an aspect of the present invention.

As shown in FIG. 11, when inputting the input data sub-scanning control signal C11 into the packing unit 41, the input DMA unit 21 inputs, into the packing unit 41, pixels P, P, . . . of a foreground image layer shown in FIG. 6, i.e. one foreground image layer having 20 lines (from L1 to L20).

When inputting the input data main-scanning control signal C12 into the packing unit 41, the input DMA unit 21 inputs, into the packing unit 41, pixels P, P, . . . for the first line L1, second line L2, . . . , or the 20th line L20. It should be noted that one input data main-scanning control signal C12 inputted firstly after the input of the input data sub-scanning control signal C11 corresponds to line L1, another input data main-scanning control signal C12 inputted secondly after the input of the input data sub-scanning control signal C11 corresponds to line L2, . . . , the other input data main-scanning control signal C12 inputted 20th after the input of the input data sub-scanning control signal C11 corresponds to line L20.

As shown by the dashed arrow C2 in FIG. 2, the packing unit 41 outputs into the memory control unit 42 a memory input sub-scanning control signal and memory input main-scanning control signals.

When outputting the memory input sub-scanning control signal and the memory input main-scanning control signal, the packing unit 41 outputs data packages D, D, . . . into the memory control unit 42.

The memory input sub-scanning control signal is continuously outputted from the packing unit 41, while outputting data packages D, D, . . . based on one of the same foreground image layer. When completing the outputting process of data packages D, D, . . . based on one of the same foreground image layer, the packing unit 41 stops to output the memory input sub-scanning control signal.

On the other hand, the memory input main-scanning control signal is continuously outputted from the packing unit 41, during outputting data packages D, D, . . . based on the part for one line of the foreground image layer. When completing the outputting process of data package D, D, . . . based on the part for one line of the foreground image layer, the packing unit 41 stops to output the memory input main-scanning control signal. Thus, the outputting process of the memory main-scanning control signal is repeated ω times, while outputting the memory sub-scanning signal. The number "ω" is equal to the number of lines contained in the foreground image layer.

As for the foreground image layer shown in FIG. 6, one memory input main-scanning control signal outputted firstly after the output of the memory input sub-scanning control signal corresponds to line L1, another memory input main-scanning control signal outputted secondly after the output of the memory input sub-scanning control signal corresponds to line L2, . . . , the other memory input main-scanning control signal outputted 20th after the output of the memory input sub-scanning control signal corresponds to line L20.

When supplied with an input data sub-scanning control signal C11 from the input DMA unit 21, as shown in FIG. 2 and FIG. 11, the packing unit 41 outputs the memory input sub-scanning control signal into the memory control unit 42.

When supplied from the input DMA unit 21 with a first input data main-scanning control signal C12 and 16 pixels P, P, . . . , the packing unit 41 outputs the first memory input main-scanning control signal into the memory control unit 42. While outputting the first memory input main-scanning control signal, the packing unit 41 outputs, into the memory control unit 42, 4 data packages D, D, . . . for the first line L1, in synchronization with every 4 clocks. When completing the outputting process of 4 data packages D, D, . . . for the first line L1, the packing unit 41 stops to output the first memory input main-scanning control signal.

When supplied from the input DMA unit 21 with a second input data main-scanning control signal C12 and 16 pixels P, P, . . . , the packing unit 41 outputs second memory input main-scanning control signal into the memory control unit 42. While outputting the second memory input main-scanning control signal, the packing unit 41 outputs into the memory control unit 42 about 4 data packages D, D, . . . for the second line L2, in synchronization with every 4 clocks. When completing the outputting process of 4 data packages D, D, . . . for the second line L2, the packing unit 41 stops to output the second memory input main-scanning control signal.

Similarly, the packing unit 41 repeatedly outputs one memory input main-scanning control signal and 4 data packages D, D, . . . , as for other lines (from the third line L3 to 19th line L19).

When supplied from the input DMA unit 21 with a 20th input data main-scanning control signal C12 and 16 pixels P, P, . . . , the packing unit 41 finally outputs the 20th memory input main-scanning control signal into the memory control unit 42. While outputting the 20th memory input main-scanning control signal, the packing unit 41 outputs into the memory control unit 42 about 4 data packages D, D, ... for the 20th line L20, in synchronization with every 4 clocks. When completing the outputting process of 4 data packages D, D, ... for the 20th line L20, the packing unit 41 stops to output the 20th memory input main-scanning control signal, and stops to output the memory input sub-scanning control signal.

As shown by the dashed arrow C3 in FIG. 2, the memory control unit 42 outputs, into the line memory 431, a memory input control signal CIN (see FIG. 11) or a memory output control signal. As shown by the dashed arrow C4 in FIG. 2, the memory control unit 42 outputs, into the line memory 432, a memory input control signal CIN or a memory output signal.

The memory control unit 42 specifies one of two line memories 431, 432 as write memory and outputs the memory input control signal CIN into the line memory specified as the write memory. The memory control unit 42 further specifies the other one of two line memories 431, 432 as read memory and outputs the memory output control signal into the line memory specified as the read memory.

In addition, the memory control unit 42 outputs, into the selector 441, an input select control signal (not shown) for selecting the line memory 431 or the line memory 432 as write memory, and an output select control signal (not shown) for selecting the line memory 431 or the line memory 432 as read memory.

As shown in FIG. 2 and FIG. 11, the memory control unit 42 outputs one memory input control signal CIN into the line memory 431 or the line memory 432 as write memory. Every time outputting one memory input control signal CIN in synchronization with a clock, the memory control unit 42 outputs one data package D via the second output unit 42c, in synchronization with the memory input control signal CIN. After outputted, the data package D is inputted into the line memory 431 or the line memory 432 as write memory, via the selector 441 which has been inputted the input select control signal. After supplied with the memory input control signal CIN and the data package D, the line memory 431 or the line memory 432 as write memory stores the inputted data package D.

As shown in FIG. 2, the memory control unit 42 outputs one memory output control signal into the line memory 431 or the line memory 432 as read memory, in synchronization with a clock. The line memory 432 or the line memory 431 as read memory, which is supplied with the memory output control signal, outputs the data package D that has already been stored, in synchronization with the supplied memory output control signal. The data package D, which is outputted from the line memory 432 or the line memory 431 as read memory, is inputted into the memory control unit 42 via the selector 442 which has been supplied with the output select control signal and via the second input unit 42d of the memory control unit 42. When supplied with the data package D, the memory control unit 42 outputs the supplied data package D into the processing unit 20 via the first output unit 42b.

As shown by the dashed arrow C5 in FIG. 2, the memory control unit 42 outputs, into the processing unit 20, a memory output sub-scanning control signal C51 and a memory output main-scanning control signal C52 (See FIG. 12).

When outputting the memory output sub-scanning control signal C51 and the memory output main-scanning control signal C52, the memory control unit 42 outputs data packages D, D, ... into the processing unit 20.

As shown in FIG. 2 and FIG. 12, the memory output sub-scanning control signal is continuously outputted from the memory control unit 42, while data packages D, D, ... based on one of the same foreground image layer are being outputted. When completing the outputting process of data package D, D, ... based on one of the same foreground image layer, the memory control unit 42 stops to output the memory output sub-scanning control signal.

On the other hand, the memory output main-scanning control signal C52 is continuously outputted from the memory control unit 42, while data packages D, D, ... based on the part for one line of the foreground image layer are being outputted. When completing the outputting process of data packages D, D, ... based on the part for one line of the foreground image layer, the memory control unit 42 stops to output the memory output main-scanning control signal C52.

As for the part for one line of the foreground image layer, the data package D is repeatedly outputted $\beta$ times, which is the same number of the types of identifier.

Thus, during the outputting process of the memory output sub-scanning control signal C51, the memory output main-scanning control signal C52 is outputted $\omega \times \beta$ times, which is the same number as the number "$\omega$" of lines of the one foreground image layer multiplied by the number "$\beta$" for outputting.

As for the foreground image layer shown in FIG. 6, four memory output main-scanning control signals C52 outputted from first to fourth after the output of the memory output sub-scanning control signal C51, corresponds to the line L1. Another four memory output main-scanning control signals C52 outputted from 5th to 8th after the output of the memory output sub-scanning control signal C51, corresponds to the line L2, ..., and another four memory output main-scanning control signals C52 outputted from 77th to 80th after the output of the memory output sub-scanning control signal C51, corresponds to the line L20.

Figure 13:
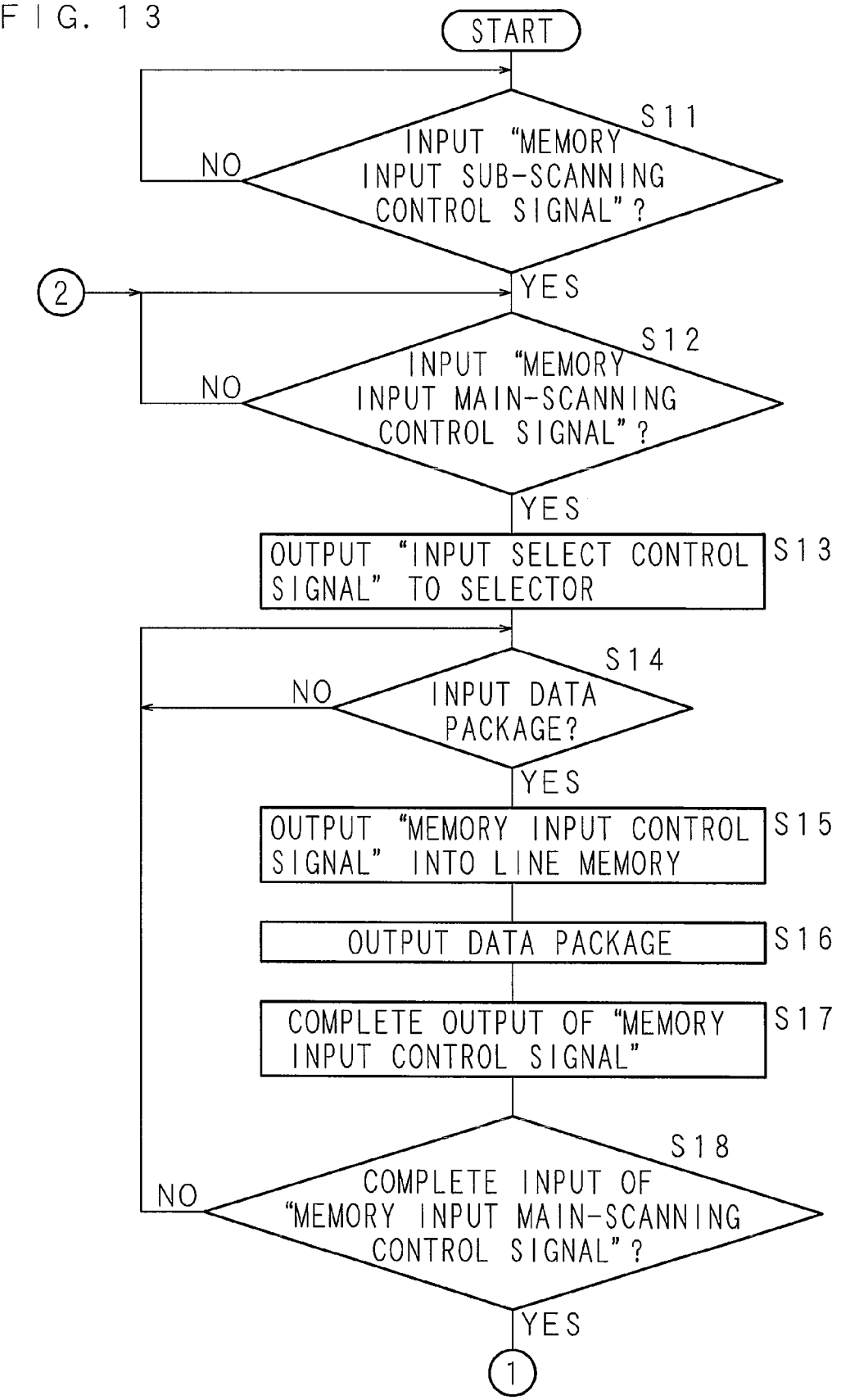
FIG. 13 is a flowchart showing a data inputting procedure carried out by a memory control unit arranged in the image compressing apparatus of Embodiment 1 according to an aspect of the present invention.
Figure 14:
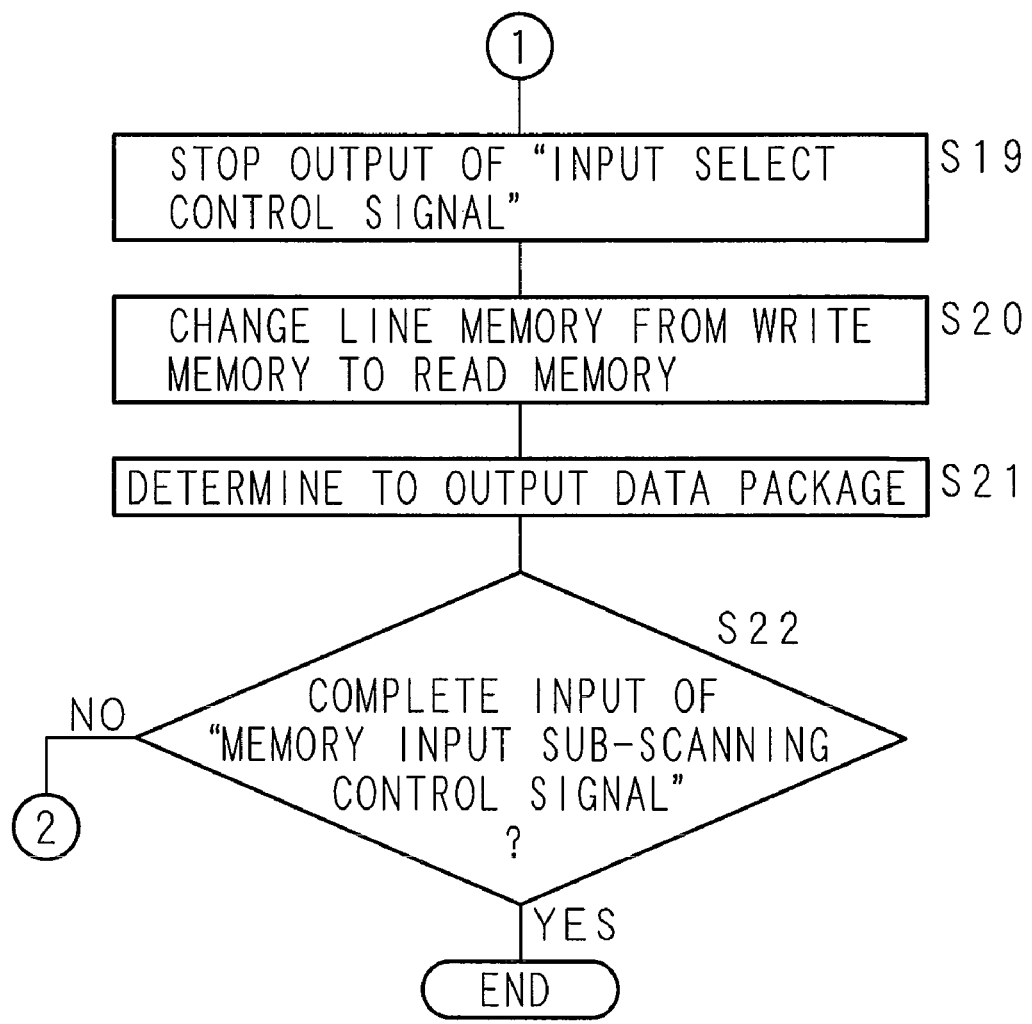
FIG. 14 is a flowchart showing the data inputting procedure carried out by the memory control unit arranged in the image compressing apparatus of Embodiment 1 according to an aspect of the present invention.
Figure 15:
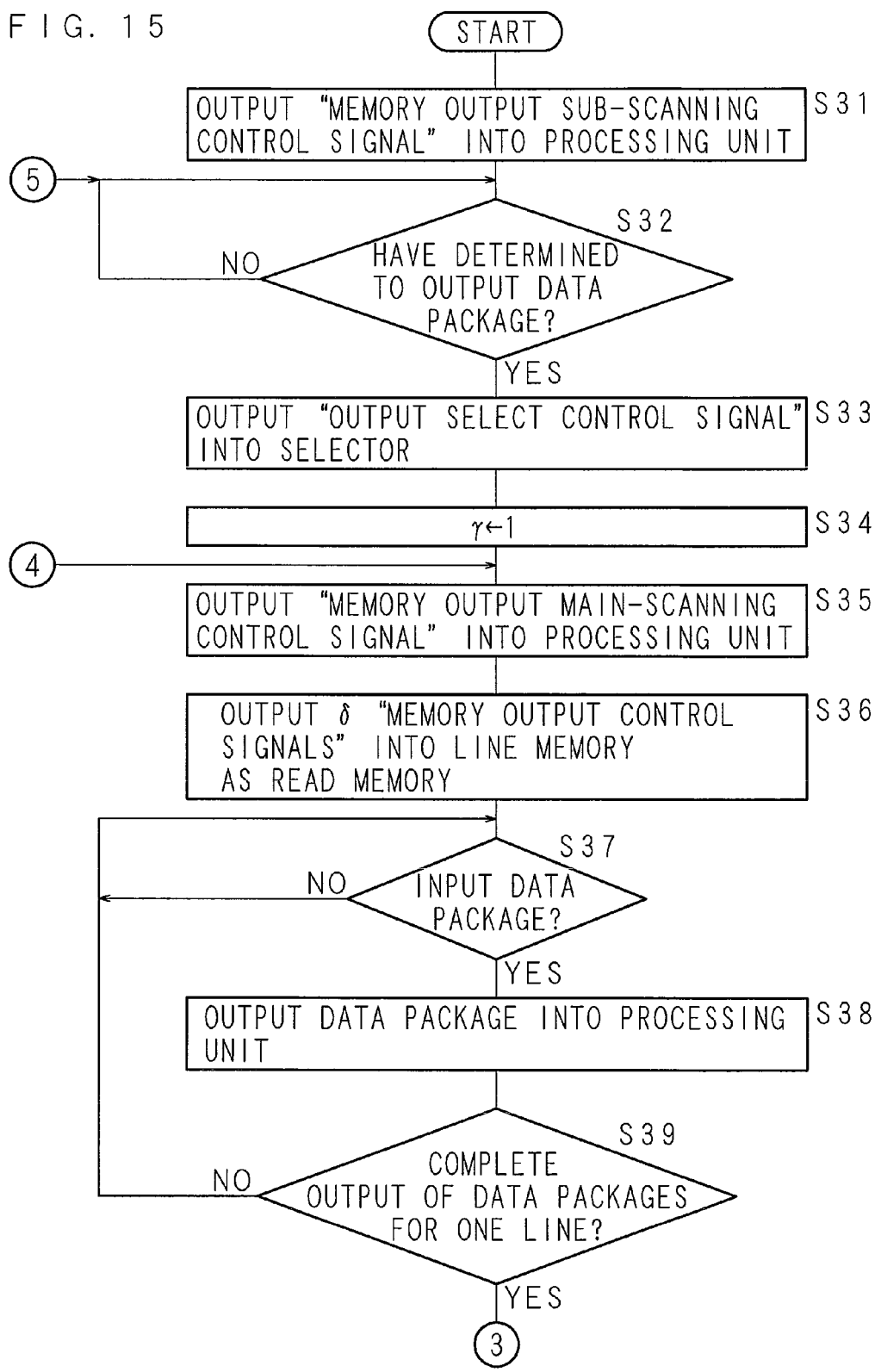
FIG. 15 is a flowchart showing another data outputting procedure carried out by the memory control unit arranged in the image compressing apparatus of Embodiment 1 according to an aspect of the present invention.
Figure 16:
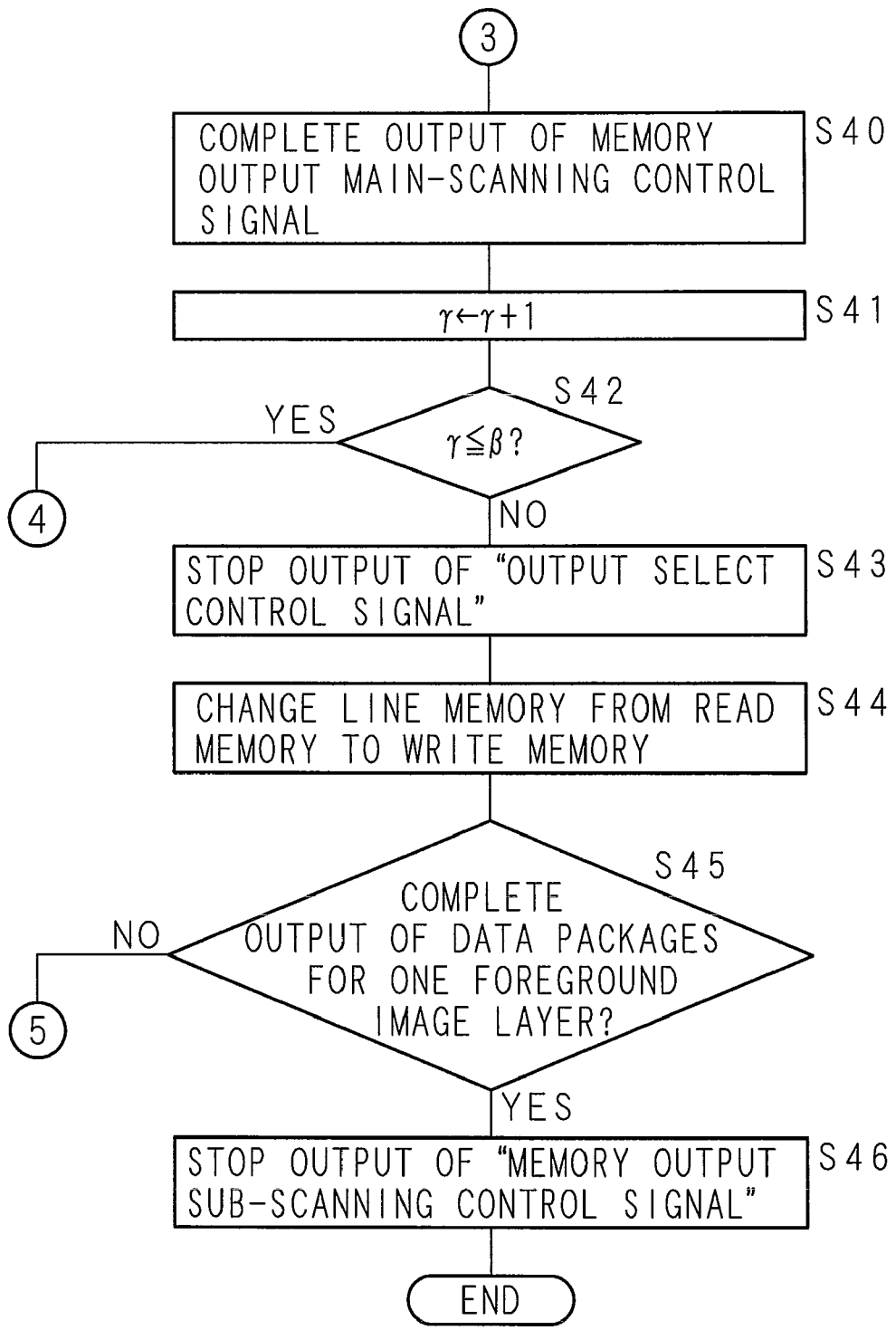
FIG. 16 is a flowchart showing the data outputting procedure carried out by the memory control unit arranged in the image compressing apparatus of Embodiment 1 according to an aspect of the present invention.

FIG. 13 and FIG. 14 are flowcharts showing data inputting procedures carried out by the memory control unit arranged in the image compressing apparatus of Embodiment 1 according to an aspect of the present invention. FIG. 15 and FIG. 16 are flowcharts showing data outputting procedures carried out by the memory control unit arranged in the image compressing apparatus of Embodiment 1 according to an aspect of the present invention.

When given from the CPU 60 a control signal indicating input/output timing for inputting and outputting data package into/from line memories 431, 432, the memory control unit 42 carries out a multitask operation for inputting data and outputting data (i.e., simultaneously).

Firstly, explanation will be given to the procedure for inputting data with the memory control unit 42. For purpose of illustration, explanation will be given about a case that line memories 431, 432 are specified as read memories before starting the procedure for inputting data.

When the procedures shown in FIG. 13 and FIG. 14 are started for inputting data, the memory control unit 42 determines whether a memory input sub-scanning control signal is inputted from the packing unit 41 or not (S11). When a memory input sub-scanning control signal has not been inputted yet (S11: NO), the memory control unit 42 repeats the process for S11.

When a memory input sub-scanning control signal has been inputted (S11: YES), the memory control unit 42 determines whether a memory input main-scanning control signal is inputted from the packing unit 41 or not (S12). When a memory input main-scanning control signal has not been inputted yet (S12: NO), the memory control unit 42 repeats the process for S12.

When a memory input main-scanning control signal has been inputted from the packing unit 41 (S12: YES), the memory control unit 42 outputs, to the selector 441, an input select control signal for selecting the line memory 431 as the write memory (S13), and then determines whether the data package D is inputted from the packing unit 41 via the first input unit 42a or not (S14). When the data package D has not been inputted yet (S14: NO), the memory control unit 42 repeats the process for S14.

When a data package D has been inputted from the packing unit 41 (S14: YES), the memory control unit 42 outputs one memory input control signal CIN, into the line memory 431 as write memory, in synchronization with a clock (S15). While outputting the "one memory input control signal CIN", the memory control unit 42 outputs the data package D inputted at S14 via the second output unit 42c, in synchronization with the memory input control signal CIN (S16). Then, the memory control unit 42 completes the output of the memory input control signal CIN (S17).

After completion of the process of S17, the memory control unit 42 determines whether the input process of the memory input main-scanning control signals from the packing unit 41 has been completed or not (S18). When the memory input main-scanning control signal is still continuously inputted (S18: NO), the memory control unit 42 returns the procedure to S14.

The procedure from S14 to S18 is repeatedly carried out $\delta$ times. The number "$\delta$" is equal to the number of data packages D, D, . . . for one line (as for the foreground image layer shown in FIG. 6, the number "$\delta$" is "4"). Thus, the line memory 431 as write memory is supplied with 4 memory input control signals CIN, CIN, . . . , and 4 data packages D, D, . . . , and stores the inputted 4 data packages D, D, . . . that correspond to one line.

It requires $\alpha$ pixels P, P, . . . to be inputted into the packing unit 41, for inputting one data package D into the memory control unit 42. In addition, the memory control unit 42 outputs one data package D every time the data package D is inputted. The outputted data package D is then written on the line memory 431 as write memory. In other words, one data package D is written on the line memory 431 as write memory, at a write interval that is a times longer than an input interval for inputting pixels P, P, . . . into the packing unit 41.

When the input process of the memory input main-scanning control signals from the packing unit 41 has been completed (S18: YES), the memory control unit 42 stops the output process of the input select control signal into the selector 441 (S19). In other words, when the input process of the data packages D, D, . . . for one line of the foreground image layer into the control unit 42 has been completed and then the data packages D, D, . . . for one line of the foreground image layer have been stored in the line memory 431 as write memory, the memory control unit 42 stops to output the input select control signal into the selector 441. Then, the memory control unit 42 changes the function of the line memory 431, from the write memory to the read memory (S20). In other words, the memory control unit 42 treats the line memory 431 for the write memory as the read memory. Then, the memory control unit 42 determines to output data packages D, D, . . . from the line memory 431 as read memory (S21).

The memory control unit 42 finally determines whether the input process of the memory input sub-scanning control signal from the packing unit 41 has been completed or not (S22). When the memory input sub-scanning control signal is still continuously inputted (S22: NO), the memory control unit 42 returns the procedure to S12. Then, the procedure from S12 to S22 is carried out on the line memory 432 as write memory. Thus, the data packages D, D, . . . for odd numbered lines L1, L3, . . . of the foreground image layer are stored in the line memory 431, while the data packages D, D, . . . for even numbered lines L2, L4, . . . of the foreground image layer are stored in the line memory 432.

When the input process of the memory input sub-scanning control signal from the packing unit 41 has been completed (S22: YES), the memory control unit 42 completes the procedure for inputting data. In other words, the input process of data packages D, D, . . . for one foreground image layer has been completed into the memory control unit 42, the memory control unit 42 stops the procedure for inputting data.

Explanation will be given to the procedure for outputting data with the memory control unit 42.

When it is started the procedures for outputting data shown in FIG. 15 and FIG. 16, the memory control unit 42 outputs a memory output sub-scanning control signal C51 into the processing unit 20 (S31). The memory control unit 42 then determines whether it has been determined, at the S21, to output data packages D, D, . . . from the line memory 431 for the read memory or not (S32). When it has not been determined to output (S32: NO), the memory control unit 42 repeats the process of S32.

When it has already been determined to output (S32: YES), the memory control unit 42 outputs, into the selector 442, an output select control signal for selecting the line memory 431 whose function is changed from the write memory to the read memory at the process S20 of inputting data (S33): The memory control unit 42 sets "1" for a parameter "$\gamma$" (S34), and then carries out a process of S35.

The memory control unit 42 outputs the memory output a main-scanning control signal C52 into the processing unit 20 (S35). The memory control unit 42 outputs total $\delta$ memory output control signals (sequentially, one by one, in synchronization with a clock) into the line memory 431 as read memory (S36). The number "$\delta$" is equal to the number of the data packages D, D, . . . for one line of the foreground image layer.

As a result, the line memory 431 as read memory is supplied with 4 memory output control signals. Every time a memory output control signal is inputted, the line memory 431 as read memory outputs one data package D. In other words, when s memory output control signals is inputted, four data packages D, D, . . . for one line are read out from the line memory 431 as read memory.

The memory output control signals are inputted into the line memory 431 as read memory, sequentially one by one, in synchronization with a clock. In other words, data packages D, D, . . . are read out from the line memory 431 as read memory, at read intervals that are the same as the input intervals inputted the pixels P, P, . . . into the packing unit 41.

As described above, while reading out the data packages D, D, . . . for one line from the line memory 431 as read memory in the procedure for outputting data, the memory control unit 42 carries out the procedure for inputting data, in parallel. Therefore, the data packages D, D, . . . for one line are written on the line memory 432 as write memory, at write intervals that are cc times longer than the input intervals. In other words, the memory control unit 42 reads out data package D, D, . . . while writing them at the write intervals $\alpha$ times longer than the input intervals, from/into the two line memories 431, 432.

The number "$\delta$" of the data packages D, D, . . . may be given, for example, from the CPU 60 in advance, or counted by the memory control unit 42 during the procedure for inputting data shown in FIG. 13 and FIG. 14.

The memory control unit 42 determines whether the data package D has been inputted via the second input unit 42d or not (S37). When the data package D has not been inputted (S37: NO), the memory control unit 42 repeats the process of S37.

When the data package D has been inputted via the second input unit 42d (S37: YES), the memory control unit 42 outputs the inputted data package D into the processing unit 20, via the first output unit 42b, in synchronization with a clock (S38).

The memory control unit 42 determines whether outputting the data packages D, D, . . . for one line has been completed or not, by checking whether the data packages D has been outputted δ times or not (S39). When outputting the data packages D, D, . . . for one line has not been completed yet (S39: NO), the memory control unit 42 returns the procedure to S37.

When outputting the data packages D, D, . . . for one line has been completed (S39: NO), outputting the memory output main-scanning control signal C52 into the processing unit 20 is completed (S40). When the memory control unit 42 carries out the processes from S35 to S40, the data packages D, D, . . . for one line are outputted.

After completion of the process of S40, the memory control unit 42 increments the parameter "γ" by "1" (S41), and then determines whether the parameter "γ" is equal to or less than "β" that is the number of types of the identifier (S42). When the "γ" is equal to "β" or less than "β" (S42: YES), the memory control unit 42 returns the procedure to S35. When the memory control unit 42 carries out the processes from the S35 to the S42, the data packages D, D, . . . for one line are outputted β times.

When the "γ" is more than "β" (S42: NO), it means that the data packages D, D, . . . for one line of the foreground image layer are outputted "β" times: the "β" represents the number of types of the identifier. Thus, the memory control unit 42 stops the output process of the output select control signal into the selector 442 (S43), and then changes a function of the line memory 431 from the read memory to the write memory (S44). The exchange of functions between the write memory and the read memory at S20 and S44 may be carried out, for example, by associating registers arranged in the memory control unit 42 with the line memories 431, 432 in advance. The exchange of functions is carried out by setting/resetting flags representing the write memory or the read memory.

Then, the memory control unit 42 determines whether outputting the data packages D, D, . . . for one foreground image layer has been completed or not, by checking whether ω foreground image layers for one line have been outputted β times or not (S45).

The number "ω" of lines contained in one foreground image layer may be given, for example, from the CPU 60 in advance, or counted by the memory control unit 42 during the procedure for inputting data shown in FIG. 13 and FIG. 14.

When outputting the data packages D, D, . . . for one foreground image layer has not been completed yet (S45: NO), the memory control unit 42 returns the procedure to S32, to output β times about foreground image layer for next one line.

When outputting the data packages D, D, . . . for one foreground image layer has been completed (S45: YES), the memory control unit 42 stops the output process of the memory output sub-scanning control signal C51 into the processing unit 20 (S46) and then ends the procedure for outputting data.

The line memories 431, 432 are alternately specified as read memory, at the process of S20 in the procedure for inputting data shown in FIG. 14. Thus, the processes from S32 to S45 in the procedure for outputting data shown in FIG. 15 and FIG. 16 are carried out, on the line memories 431, 432 alternately. Similarly, line memories 431, 432 are alternately specified as write memory, at the process of S44 in the procedure for outputting data shown in FIG. 16. Thus, the processes from S12 to S22 in the procedure for inputting data shown in FIG. 13 and FIG. 14 are carried out, on the line memories 431, 432 alternately.

Figure 17:
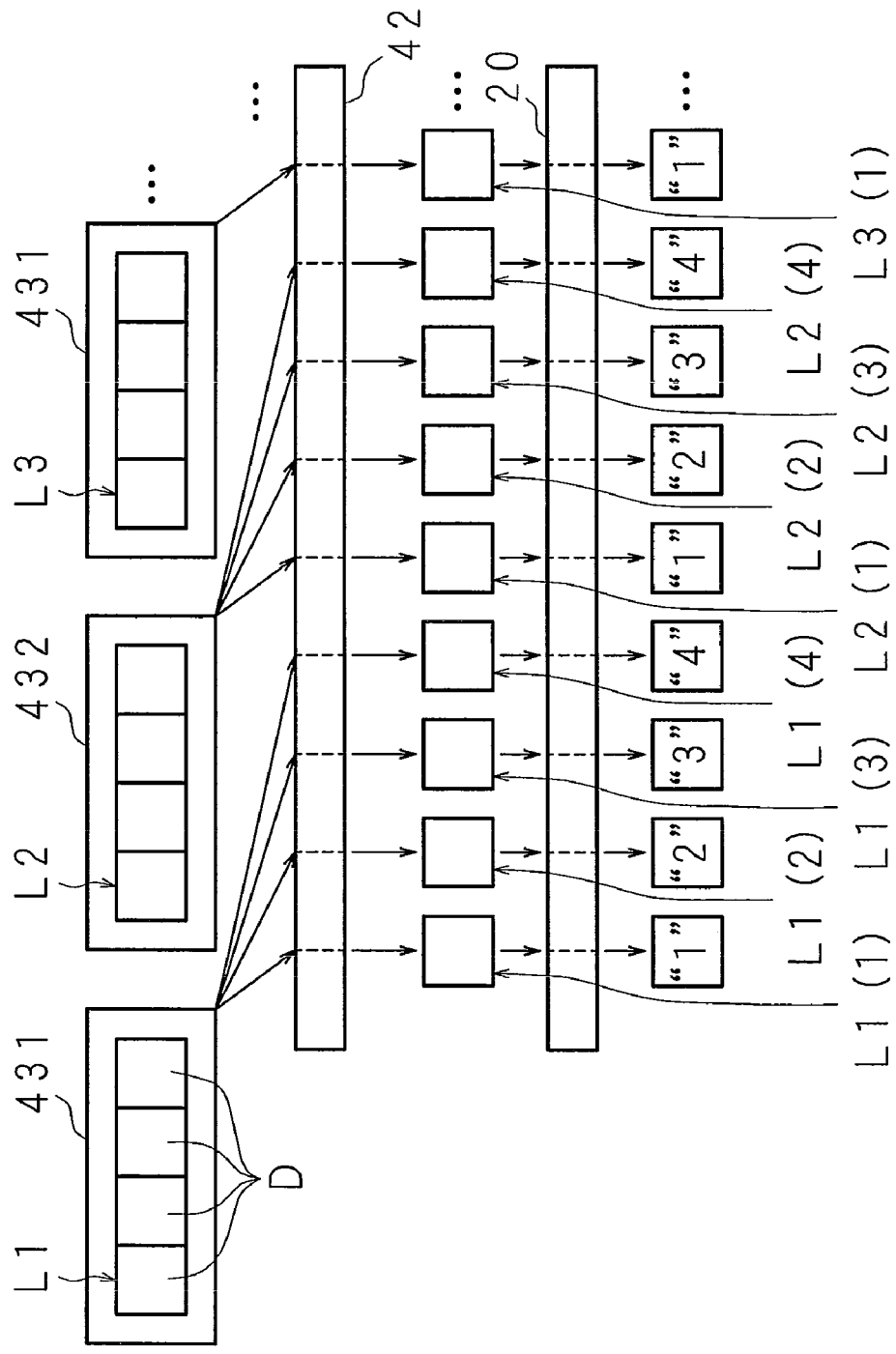
FIG. 17 is a diagrammatic illustration to explain inputting and outputting the data package at the line memories, memory control unit and a processing unit of the image compressing apparatus of Embodiment 1 according to an aspect of the present invention.

FIG. 17 is a diagrammatic illustration to explain inputting and outputting data packages at the line memories, memory control unit and a processing unit of the image compressing apparatus of Embodiment 1 according to an aspect of the present invention.

Firstly, the data packages D, D, . . . for the first line L1 are read out from the line memory 431 as read memory, and then repeatedly outputted β times into the processing unit 20 via the memory control unit 42.

The processing unit 20 carries out binarization: identifier "1" of the first input data package D, D, . . . for the first line L1 is represented by "1"; and the remaining identifiers are represented by "0". Secondly, the processing unit 20 carries out another binarization: identifier "2" of the second input data package D, D, . . . for the first line L1 is represented by "1"; and the remaining identifiers are represented by "0". Similarly, the processing unit 20 carries out the other binarizations: identifier "3" to "β" of the third to βth input data package D, D, . . . for the first line L1 are represented by "1"; and the remaining identifiers are represented by "0".

Then, the line memory 431 as read memory is changed to write memory. Around the time when the line memory 431 as read memory is changed to write memory, the line memory 432 is changed to read memory.

The data packages D, D, . . . for the second line L2 are then read out from the line memory 432 as read memory, and repeatedly outputted β times into the processing unit 20 via the memory control unit 42.

The processing unit 20 carries out binarization: identifier "1" of the first input data packages D, D, . . . for the second line L2 is represented by "1"; and the remaining identifiers are represented by "0". Then, the processing unit 20 carries out another binarization: identifier "2" of the second input data packages D, D, . . . for the second line L2 is represented by "1"; and the remaining identifiers to are represented by "0". Similarly, the processing unit 20 carries out the other binarizations: identifier "3" to "β" of the third to βth input data packages D, D, . . . for the second line L2 are represented by "1"; and the remaining identifiers are represented by "0".

Then, the line memory 432 as read memory is changed to write memory. Around the time when the line memory 432 as read memory is changed to write memory, the line memory 431 is changed to read memory.

Similarly, the processing unit 20 carries out binarization on the data packages D, D, . . . for the third line L3 to the ωth line Lω.

As the results, there are β×ω binary images for one line that are outputted into the output DMA unit 22.

In Embodiment 1, the data packages for the first line L1 to the 20th Line L20 are subjected to binarization on the respective identifiers "1" to "4". Thus, there are 80 (=4×20) binary images for one line are outputted.

In addition, the binary image generating unit 2 may arrange more than one processing units 20, input DMA units 21 and output DMA units 22. For example, "ν" processing units 201, 202, . . . , 20β, . . . 20ν may be arranged, "ν" being a number corresponding to an upper limit ν of the types of the identifiers. In this case, the first data packages D, D, . . . for the first line L1 outputted from the memory control unit 42 are inputted into the processing unit 201 that carries out binarization on the identifier "1". The second data packages D, D, ... for the first line L1 outputted from the memory control unit 42 are then inputted into the processing unit 202 that carries out binarization on the identifier "2". Similarly, the βth data packages D, D, ... for the first line L1 outputted from the memory control unit 42 are inputted into the processing unit 20β that carries out binarization on the identifier "β".

Hereinafter, the "data package D" after the binarization is referred to as "binary data d".

As shown by the dashed arrow C6 in FIG. 2, the processing unit 20 outputs, into the output DMA unit 22, an output data sub-scanning control signal C61 and an output data main-scanning control signal C62 (See FIG. 12).

While outputting the output data sub-scanning control signal C61 and the output data main-scanning control signal C62, the processing unit 20 outputs the binary data d, d, ... into the output DMA unit 22.

As shown in FIG. 2 and FIG. 12, while outputting the binary data d, d, ... for the same one foreground image layer, the processing unit 20 continuously outputs the output data sub-scanning control signal C61. When outputting the binary data d, d, ... for the same one foreground image layer has been completed, the processing unit 20 stops to output the output data sub-scanning control signal C61.

However, while outputting the binary data d, d, ... for one line of the same one foreground image layer, the processing unit 20 continuously outputs the output data main-scanning control signal C62. When outputting the binary data d, d, ... for one line of the same one foreground image layer has been completed, the processing unit 20 stops to output the output data main-scanning control signal C62.

The binary data d, d, ... for one line of the same one foreground image layer is repeatedly outputted β times.

Thus, while outputting the output data sub-scanning control signal C61, the processing unit 20 outputs the output data main-scanning control signal C62 a number of "ω×β" times: "ω" represents the number of lines contained in the foreground image layer; and "β" represents the number of outputs.

Thus, as for the foreground image layer shown in FIG. 6, the output data main-scanning control signal C62, outputted firstly to fourthly after the output of the output data sub-scanning control signal C61, are corresponding to line L1. The output data main-scanning control signal C62, outputted 5th to 8th after the output data sub-scanning control signal C61, are corresponding to line L2. Similarly, the output data main-scanning control signal C62, outputted 77th to 80th after the output of the output data sub-scanning control signal C61, are corresponding to line L20.

The output DMA unit 22 requests the transmission control unit 62 to transfer binary images, and outputs the binary images for one line at a time. The output DMA unit 22 is given start addresses for all the identifiers by the CPU 60, in advance. Thus, the output DMA unit 22 requests the transmission control unit 62 to write data in accordance with the start addresses.

The output DMA unit 22 sequentially outputs at a time the binary images for one line corresponding to D types of identifier, into the image memory 61 via the transmission control unit 62. In the image memory 61, the outputted binary images are successively stored in memory regions. Each of the memory regions corresponds to each of the β types of identifier.

The CPU 60 sets start addresses for all the identifiers. Thus, the image memory 61 exclusively prepares a memory region for the binary image corresponding to each identifier, in advance. Therefore, when a binary image for the identifier "4" is outputted earlier than a binary image for the identifier "1", the binary image for the identifier "4" is not accidentally written on a memory region prepared for the binary image for the identifier "1". It means that the relationship between each identifier and a binary image stored in the image memory 61 is easily recognized by the start address for the identifier.

It should be noted that the present invention is not limited to the configuration in which the CPU sets the start addresses of the memory regions for storing binary images. For example, processing unit 20 may set the start addresses.

Finally, explanation will be given to the configuration and operation of the binary image compressing unit 3 shown in FIG. 1.

In accordance with a transfer request from the input DMA 31, one binary image is read out from the image memory 61, transferred via the transmission control unit 62, and then inputted into the input DMA unit 31.

The input DMA 31 outputs the inputted one binary image into the processing unit 30.

The processing unit 30 generates a compressed image, by compressing the inputted binary image with the use of well-known lossless compression technique, and then outputs the compressed image thus generated into the output DMA unit 32.

The output DMA unit 32 requests the transmission control unit 62 to transfer one compressed image, and then outputs the compressed image. The compressed image outputted from the output DMA unit 32 is outputted to the image memory 61 via the transmission control unit 62, and then stored in the image memory 61.

As described above, a color image is separated into a foreground image layer and a background image layer. The foreground image layer is then compressed to generate β compressed images, while the background image layer is then compressed to generate a compressed image. In addition, an IC table stored in the table storage 121 is read out and compressed for example with the use of well-known lossless compression technique, to complete a procedure for compressing one color image.

Such image compressing apparatus 6 packs α pixels P, P, ... as a unit, writes on the line memory 431 or line memory 432 as write memory data packages D, D, ... at write intervals that are α times longer than the input intervals for inputting the pixels P, P, ..., and repeatedly read out β times from the line memory 432 or the line memory 431 as read memory the data packages for β types of the identifier at read intervals that are the same as the input intervals. These configurations lead advantages to output β binary images in response to inputting one foreground image layer, without changing the speed of the clock rates to be β times faster.

The image compressing apparatus 6 may arrange block memories, instead of the line memories 431, 432. The procedure for compressing color images may be carried out in blocks.

Embodiment 2

Figure 18:
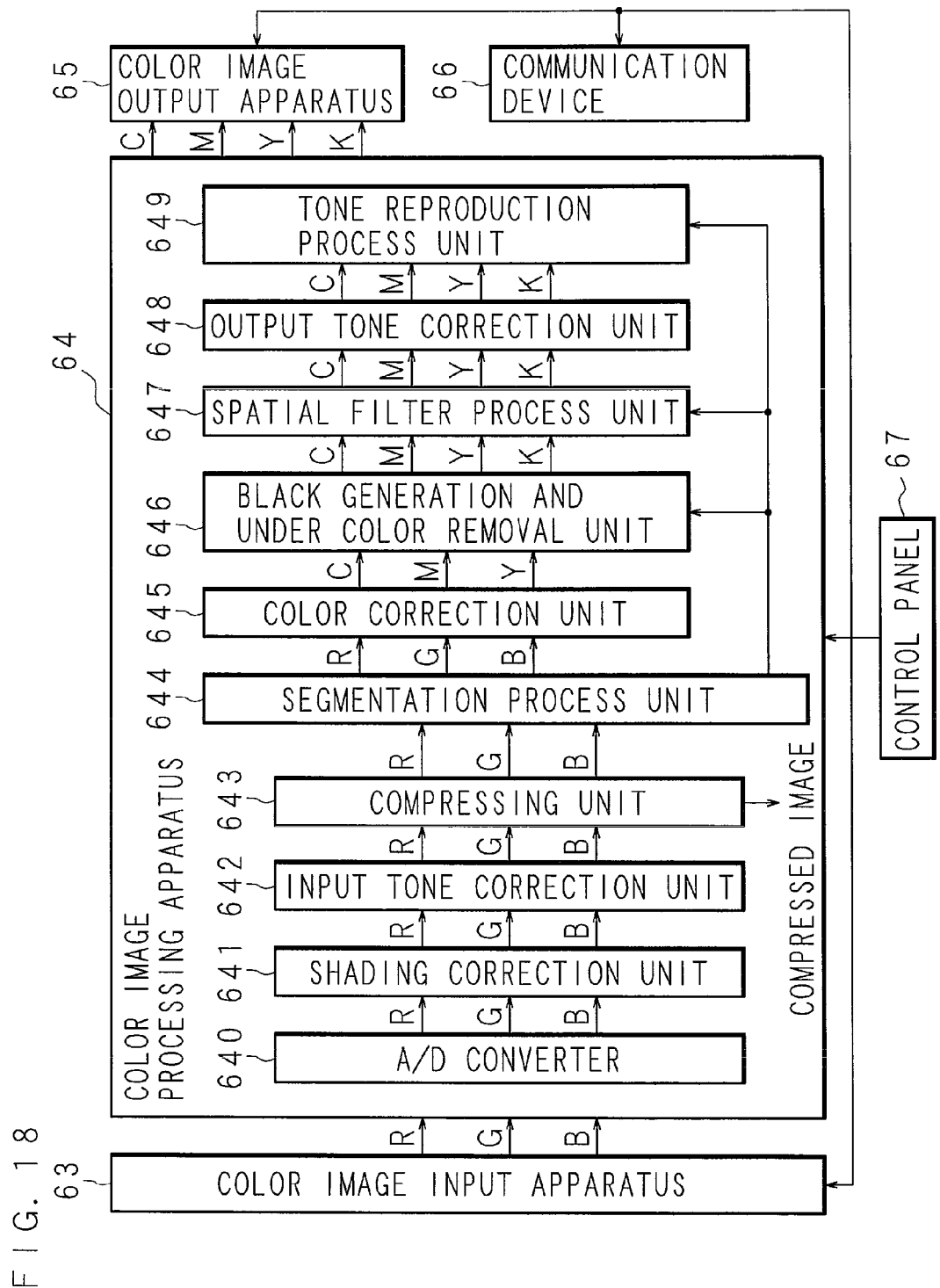
FIG. 18 is a block diagram showing configurations of main sections for an image forming apparatus of Embodiment 2 according to an aspect of the present invention.

FIG. 18 is a block diagram showing configurations of main sections for an image forming apparatus of Embodiment 2 according to an aspect of the present invention.

In Embodiment 2, it will be explained about example of the image forming apparatus, with functions as digital multifunction printer.

The image forming apparatus arranges a color image input apparatus 63, color image processing apparatus 64, color image output apparatus 65, communication device 66 and a control panel 67. The color image processing apparatus 64 arranges an A/D converter 640, shading correction unit 641, input tone correction unit 642 and a compressing unit 643. The compressing unit 643 corresponds to the image compressing apparatus 6 of the pixel input-output apparatus 4 in Embodiment 1 shown in FIG. 1. Each part of such image forming apparatus is controlled by a CPU (not shown).

The color image processing apparatus 64 further arranges a segmentation process unit 644, color correction unit 645, black generation and under color removal unit 646, spatial filter process unit 647, output tone correction unit 648 and a tone reproduction process unit 649.

The control panel 67 is connected to the color image input apparatus 63, color image processing apparatus 64, color image output apparatus 65 and the communication device 66. In addition, the control panel 67 arranges: a control section, such as setting buttons for setting an operation mode of the image forming apparatus and numeric pads; and a display section, such as a liquid crystal display.

The color image input apparatus 63 is configured, for example with a color scanning unit having a charge coupled device (CCD), and is connected to an input side of the color image processing apparatus 64. The color scanning unit reads a light image reflected from a document through RGB analog signals, with the use of the CCD, and then inputs the analog signals into the color image processing apparatus 64.

In the color image processing apparatus 64, a color image that consists of the analog signals inputted from the color image input apparatus 63 is transferred to the A/D converter 640, shading correction unit 641, input tone correction unit 642, compressing unit 643, segmentation process unit 644, color correction unit 645, black generation and under color removal unit 646, spatial filter process unit 647, output tone correction unit 648, and then the tone reproduction process unit 649, in that order. After transferred to the tone reproduction process unit 649, the color image is stored in the image memory 61. The color image stored in the image memory 61 is read out at a predetermined timing, and then outputted as a stream into the color image output apparatus 65.

The color image output apparatus 65 is one of an image forming apparatus, for example with the use of electrographic method or inkjet printing method, and has a function as an image forming means that forms a color image on a recording sheet (e.g., a recording paper). It should be noted that, however, the color image output apparatus 65 is not limited to such configurations described above.

Alternatively, the image forming apparatus may arrange a monochrome image output apparatus, instead of the color image output apparatus 65. In this case, the color image is converted into a monochrome image by the color image processing apparatus 64, and then outputted into the monochrome image output apparatus.

It will be explained about image processing carried out by the color image processing apparatus 64.

The A/D converter 640 converts RGB analog signals into RGB digital signals. The shading correction unit 641 removes, from the RGB digital signals transferred from the A/D converter 640, shadings caused at an image lighting system, image focusing system, and an image sensing system of the color image input apparatus 63.

The input tone correction unit 642 carries out an input tone correction process to the RGB signals that have been removed shadings by the shading correction unit 641 (i.e. reflectance signals of RGB). The input tone correction process means to adjust a color balance and to convert each signals into signals such as density (pixel value) signals that can be processed easily by the color image processing apparatus 64.

The compressing unit 643 carries out a color image compressing process for the RGB signals that have been carried out the input tone correction process (in other words, the color image of Embodiment 1 inputted into the foreground image mask generating unit 11, foreground image layer generating unit 12 and the background image layer generating unit 13). A compressed color image is stored in the image memory 61. For example, when a "scan to e-mail" mode is selected through the control panel 67, the compressed color image stored in the image memory 61 is attached to an e-mail and sent to a destination set through the control panel 67, by the communication device 66 having a network card, modem and the like.

When the color image compressing process is not carried out, the compressing unit 643 directly outputs the RGB signals inputted from the input tone correction unit 642, into the segmentation process unit 644 described later.

In accordance with the inputted RGB signals, the segmentation process unit 644 segments all pixels into any one of a text segment, halftone segment, and a photograph segment. The segmentation process unit 644 outputs segmentation class signals based on the result of the segmentation, into the black generation and under color removal unit 646, spatial filter process unit 647, and the tone reproduction process unit 649. The segmentation class signals represent a segment of pixel. In addition to outputting the segmentation class signals, the segmentation process unit 644 directly outputs the RGB signals inputted from the input tone correction unit 642 to the color correction unit 645 described later.

The color correction unit 645 removes color impurities caused by spectral characteristics of color material CMY (C: cyan, M: magenta, Y: yellow), because the color material CMY has useless absorption components, in order to realize a faithful color reproduction.

The black generation and under color removal unit 646 carries out: a black generation process that generates black (K) signals based on the three color (CMY) signals carried out the color correction process; and a CMY signal generation process that generates new CMY signals by removing the generated K signals from the original CMY signals (i.e., the CMY signals before carried out the color correction process). It follows that the three color CMY signals are converted into four color CMYK signals.

As for the black generation process, it is generally known to use a skelton black method. In the skelton black method, a black generation and under color removal process is expressed with the following formulas (1) to (4) [input-output characteristics of skelton curve: y=f(x); input data: C, M and Y; output data: C', M', Y' and K': under color removal rate (UCR): $\epsilon(0<\epsilon<1)$].

$$K'=f\{\min(C,M,Y)\} \quad (1)$$

$$C'=C-\epsilon K' \quad (2)$$

$$M'=M-\epsilon K' \quad (3)$$

$$Y'=Y-\epsilon K' \quad (4)$$

The spatial filter process unit 647 carries out a spatial filter process based on the segmentation class signals inputted from the segmentation process unit 644 with the use of digital filter, against the color image of CMYK signals inputted from the black generation and under color removal unit 646. Thus, the spatial filter process unit 647 prevents the color image outputted by the color image output apparatus 65 from appearing blurry and reducing graininess, by correcting a special frequency characteristic.

As well as the spatial filter-process unit 647, the tone reproduction process unit 649 carries out a predetermined process based on the segmentation class signals inputted from the segmentation process unit 644, against the color image of CMYK signals.

For example, pixels segmented into the text segment by the segmentation process unit 644 are emphasized (sharpened) a high frequency component in an edge enhancement process of the special filter process by the special filter process unit 647, in order to improve reproducibility of a black text or a color text especially.

In the tone reproduction process unit 649, it is selected either binarization process or a multi-level dithering process on a high-resolution screen suitable for reproducing the high frequency component.

On the other hand, pixels segmented into the halftone segment by the segmentation process unit 644 are carried out lowpass filter process by the spatial filter process unit 647, for removing inputted halftone components.

The color image outputted from the spatial filter process unit 647 is carried out an output tone correction process by the output tone correction unit 648, and converted signals, such as density signals, into a halftone area ratio that is a characteristic value of the color image output apparatus 65. After the output tone correction process, the color image is carried out a tone reproduction process (to generate halftone) by the tone reproduction process unit 649, for reproducing tones of all the pixels that are segmented from the color image. It should be noted that pixels segmented into the photograph segment by the segmentation process unit 644 are carried out binarization process or multi-level dithering process, with the use of screen suitable for tone reproduction.

As for sending facsimile, the CPU 60 carries out a process to communicate the communication device 66 with the destination. The communication device 66 consists of a modem. When it is possible to communicate, the CPU 60 reads out from the image memory 61 about a compressed color image in a predetermined manner (i.e., the compressed color image that is compressed (encoded) the color image read into by the color image input apparatus 63), carries out a required process, such as conversion of the compressing format, and then sequentially sends the compressed color image to the destination via a communication line.

As for receiving facsimile, the CPU 60 receives a color image sent from an originating communication device and inputs the received color image into the color image processing apparatus 64, in parallel with carrying out a process to communicate. The color image processing apparatus 64 then carries out an decompressing (decoding) process against the inputted color image, with the use of a compression/decompressing (decoding) process unit (not shown). The decompressed color image is appropriately carried out a rotation process and/or a resolution conversion process by a process unit (not shown), if required. In addition, the decompressed color image is carried out the output tone correction process by the output tone correction unit 648, carried out the tone reproduction process by the tone reproduction process unit 649, and outputted from the color image output apparatus 65.

In addition, the CPU 60 carries out data communication via a network card (not shown) and a LAN cable (not shown) with a computer, other digital multi-function printer and the like, connected to the network.

In Embodiment 2, although it is illustrated that the compressing unit 643 is arranged upstream of the segmentation process unit 644, the compressing unit 643 may be arranged downstream of the segmentation-process unit 644. In this case, the foreground image mask may be generated on the basis of the result of the segmentation process. Furthermore, the image data outputted from the compressing unit 643 may be stored in a hard disk or the like. In this case, following processes may be carried out after reading out the stored image data from the hard disk, in response to user's request for printing.

Embodiment 3

Figure 19:
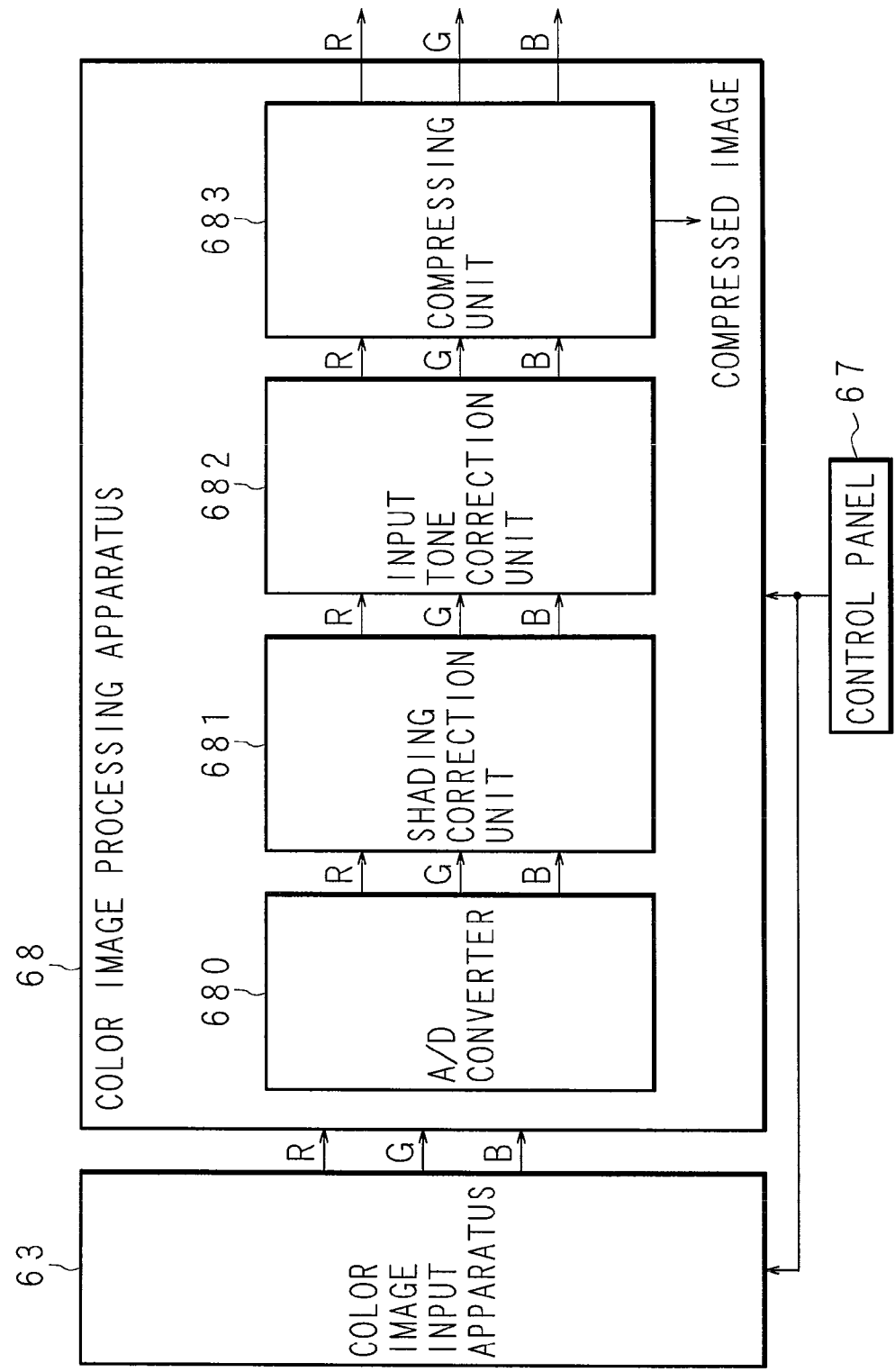
FIG. 19 is a block diagram showing configurations of main sections for an image reading apparatus having an image compressing apparatus of Embodiment 3 according to an aspect of the present invention.

FIG. 19 is a block diagram showing configurations of main sections for an image reading apparatus having an image compressing apparatus of Embodiment 3 according to an aspect of the present invention.

In Embodiment 3, it will be explained about example of the image reading apparatus, with functions as flat bed scanner.

The image reading apparatus arranges a color image input apparatus 63, control panel 67 and a color image processing apparatus 68. The color image processing apparatus 68 arranges an A/D converter 680, shading correction unit 681, input tone correction unit 682 and a compressing unit 683. The compressing unit 683 corresponds to the image compressing apparatus 6 having the pixel input-output apparatus 4 of Embodiment 1 shown in FIG. 1. Each part of such image reading apparatus is controlled by the CPU 60 (not shown).

The control panel 67 is connected to both of the color image input apparatus 63 and color image processing apparatus 68. As well as the control panel 67 of Embodiment 2, the control panel 67 of Embodiment 3 arranges: a control section, such as setting buttons for setting an operation mode of the image reading apparatus and numeric pads; and a display section, such as a liquid crystal display (LCD display).

The color image input apparatus 63 of Embodiment 3 has the same structure as the color image input apparatus 63 of Embodiment 2, and inputs analog RGB signals based on read document into the color image processing apparatus 68.

In the color image processing apparatus 68, a color image that consists of the analog signals inputted from the color image input apparatus 63 is transferred to the A/D converter 680, shading correction unit 681, input tone correction unit 682 and the compressing unit 683, in that order. After transferred to the compressing unit 683, the color image is stored in the image memory 61.

The A/D converter 680, shading correction unit 681, input tone correction unit 682 and the compressing unit 683 are respectively similar as the A/D converter 640, shading correction unit 641, input tone correction unit 642 and the compressing unit 643 of Embodiment 2.

The color image outputted from the color image processing apparatus 68 are transferred via a network card (not shown) and a LAN cable (not shown), to a computer connected to the network.

Embodiment 4

In the present invention, it is possible to record the pixel input-output method or the image compressing method according to an aspect of the present invention, onto a recording medium. The recording medium is storing thereon program codes of a computer program (e.g., execute form program, intermediate code program, source program) for causing a computer to execute several steps of recorded method.

Thus, it is possible to provide easily the pixel input-output method or the image compressing method according to an aspect of the present invention, because of the portable recording medium.

In Embodiment 4, a memory arranged on a computer (e.g., ROM) may be the recording medium. Alternatively, a computer may be connected to an external storage device, the computer may read out programs from the external storage device after the recording medium is inserted into the external storage device, and the external storage may be the recording medium.

In both cases, a computer program of the recording medium may be accessed and executed directly by a microprocessor, or may be accessed and executed through reading out program code, downloading the read program code in program storage area of the computer and executing in accordance with the downloaded program code. In this case, another computer program may be stored in advance for downloading the program code.

Although the recording medium is illustrated to be detachable from the computer, the recording medium is not limited to the configuration. It should be noted that the recording medium may consists of: a tape type recording medium, such as magnetic tape or cassette tape; magnetic disc, such as flexible disk or hard disk; optical disk, such as CD-ROM, MO, MD or DVD; card type recording medium, such as IC card (memory card) or optical card; or a semiconductor memory storing a computer program fixedly, such as mask ROM, erasable programmable read only memory (EPROM), electrically erasable programmable read only memory (EEPROM) or flash ROM.

In Embodiment 4, it is configured to connect with communication network including Internet. Thus, the recording medium may flexibly store program code downloaded from the communication network. In the case of downloading program code from the communication network, another computer program may be stored in the main computer, in advance, for downloading the program code, may be installed from another recording medium. It should be noted that the present invention may be implemented with the use of computer data signals embodied on a carrier wave through electronic transmission of the program code.

Such recording medium is read by a computer program reading apparatus of digital color image forming apparatus or computer system, and then the pixel input-output method or the image compressing method described above are executed.

The computer system is configured from: an image input apparatus, such as a flat bed scanner, film scanner or a digital camera; a computer executing several processes, such as the pixel input-output method or the image compressing method, with the use of downloaded computer program; image displaying apparatus, such as CRT display or LCD display for showing operation results of the computer; and a printer for outputting the operation results of the computer, for example, on a recording sheet. In addition, the computer system arranges communication means, such as a network card or a modem, for accessing, for example, to server through the network.

It will be explained about an image compressing apparatus that consists of a personal computer, for purpose of illustration.

Figure 20:
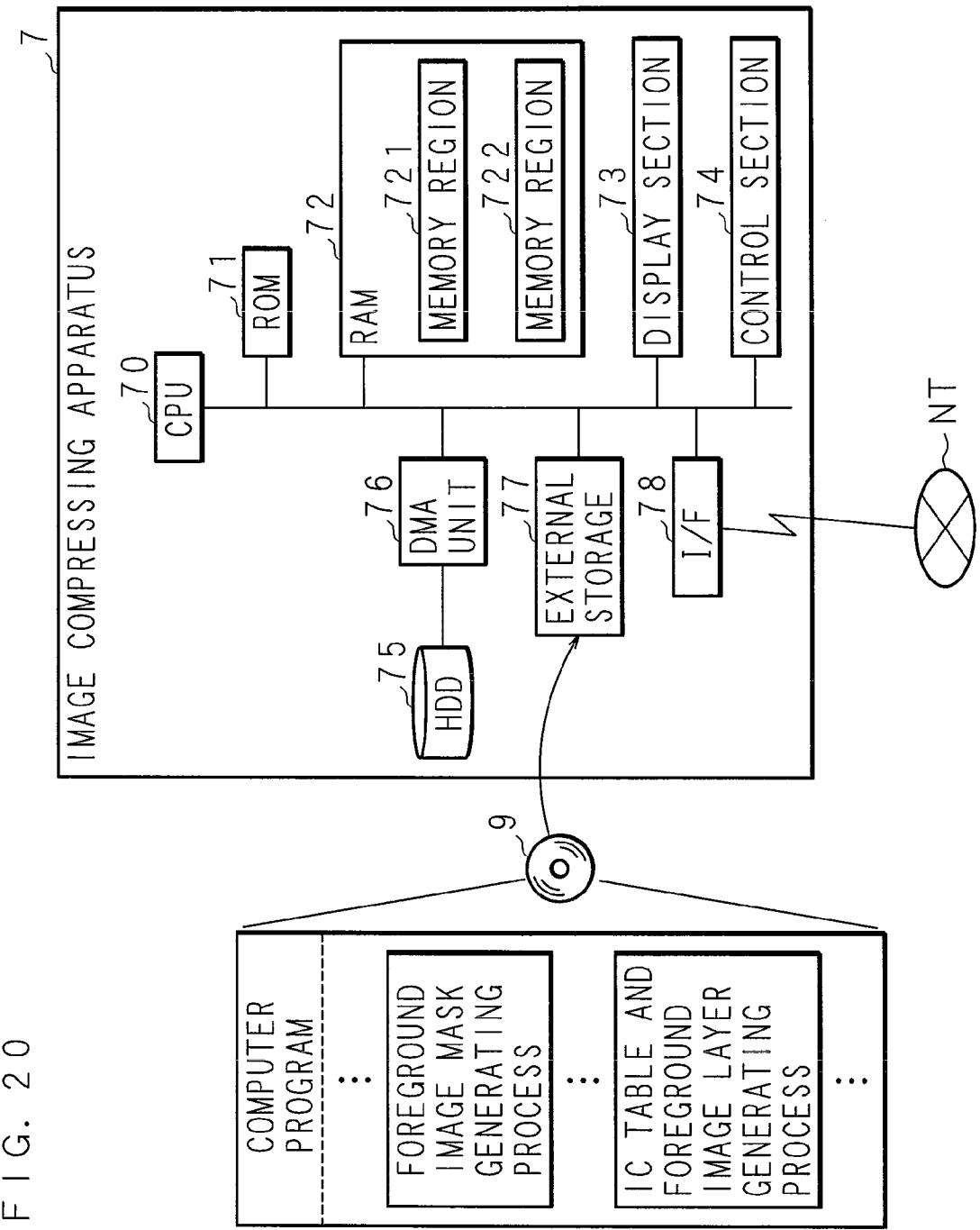
FIG. 20 is a block diagram showing configurations of main sections for the image compressing apparatus of Embodiment 4 according to an aspect of the present invention.

FIG. 20 is a block diagram showing configurations of main sections for the image compressing apparatus of Embodiment 4 according to an aspect of the present invention.

Numeral 7 in FIG. 20 represents the image compressing apparatus. The image compressing apparatus 7 arranges: a CPU 70, ROM 71, RAM 72, display section 73, control section 74, hard disk drive (HDD) 75, DMA unit 76, external storage 77, and an interface (I/F) 78. These parts are properly connected via a bus, signal line and the like.

The image compressing apparatus 7 is connected to a network NT via the I/F 78 and communicates with another personal computer connected to the network NT.

The HDD 75 is an auxiliary storage device of the image compressing apparatus, and is written several computer programs, data and the like through the DMA unit 76.

The DMA unit 76 transfers a computer program, data and the like, which are read out from the HDD 75 or are to be written on the HDD 75, in response to a transfer request inputted into the DMA unit 76. When inputted plural transfer requests simultaneously, the DMA unit 76 determines priority order about the inputted plural transfer requests and then carries out transfer processes in descending order of the priority. The order of priority may be set in the DMA unit 76 by the CPU 70 at proper timing, or may be set in the DMA unit 76 as default setting.

The external storage 77 may consist of CD-ROM drive, for example. In accordance with the CPU 70, the external storage 77 reads a computer program, data and the like, from a portable recording medium (e.g., a CD-ROM 9 storing the computer program of Embodiment 4). The read computer program, data and the like, are written on the HDD 75 via the DMA unit 76.

The CPU 70 is a center for control, and utilizes the RAM 72 which is main storage device of the image compressing apparatus 7, as a work area. The CPU 70 controls each part of the image compressing apparatus 7 and carries out each process, in accordance with the computer program, data and the like, stored in the ROM 71 and/or the HDD 75.

In other words, the personal computer functions as the image compressing apparatus 7 having the pixel input-output apparatus according to an aspect of the present invention, by carrying out a color image compressing process including: a foreground image mask generating process (see S51 shown in FIG. 21 described later); IC table and foreground image layer generating process (see S52); data package generating process (see S73 shown in FIG. 22 described later); binarization process (see S84 shown in FIG. 23 described later) and the like, in accordance with the computer program according to an aspect of the present invention.

In addition, the RAM 72 arranges memory regions 721, 722 as write memory and read memory.

The display section 73 consists of, for example, a LCD display. The display section 73 shows: messages representing operation status of the image compressing apparatus 7; messages representing several indication for users and the like, in response to the control of the CPU 70. The control section 74 consists of, for example, a key board and a mouse.

Users see the display section 73 of the image compressing apparatus 7 and handle the control section 74, to generate a color image with the use of an image drawing software, document creation software or the like, and to store the generated color image into the HDD 75. After compressing the color image stored in the HDD 75, users handle the control section 74, for example, to make the image compressing apparatus 7 send an e-mail with the compressed color image.

For purpose of illustration, the image compressing apparatus has been explained to be implemented with the use of the personal computer, as described above. It should be noted the present invention is not limited to the configurations. The image compressing apparatus may be implemented as an image processing apparatus by combining the image compressing apparatus with other processes, such as a color correction process, filter process, a halftone process.

Figure 21:
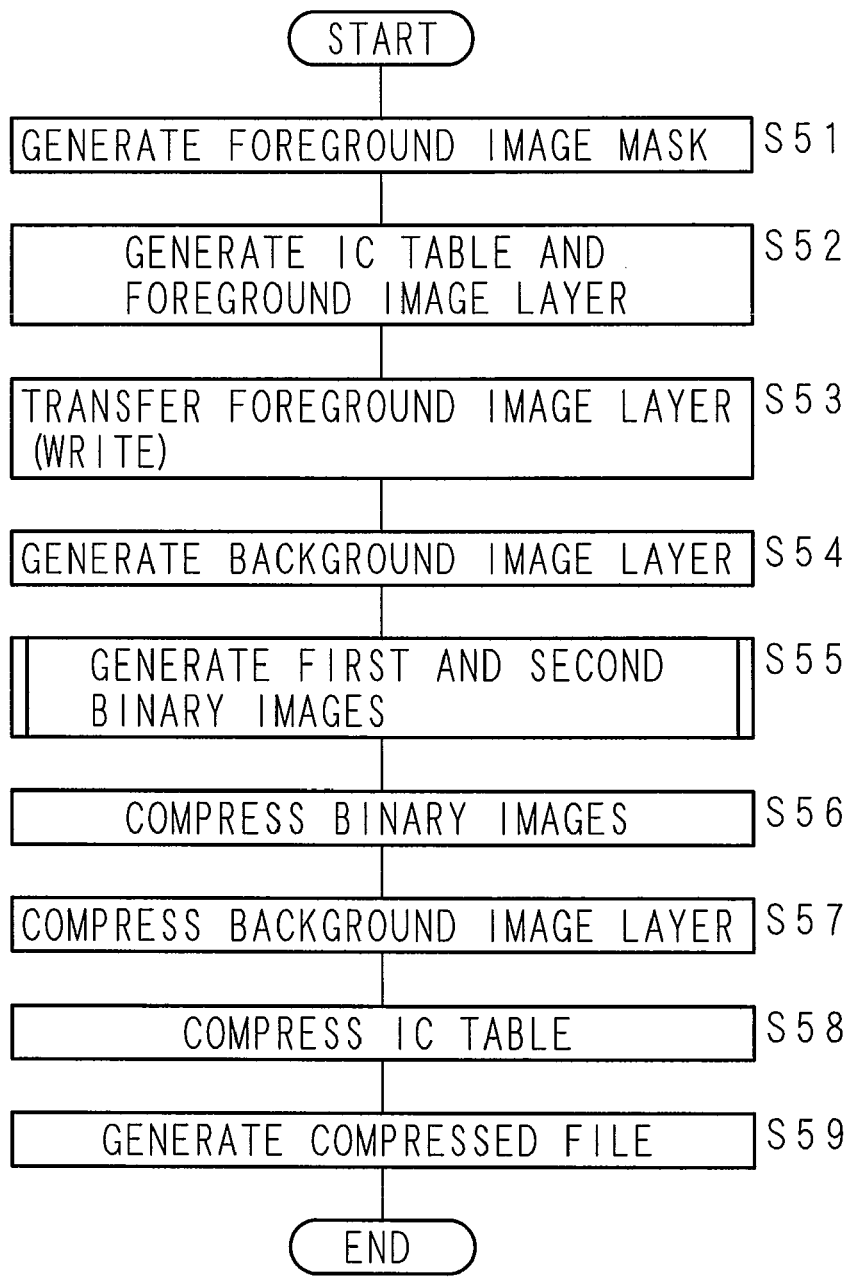
FIG. 21 is a flowchart showing a color image compressing procedure carried out by the image compressing apparatus of Embodiment 4 according to an aspect of the present invention.

FIG. 21 is a flowchart showing a color image compressing procedure carried out by the image compressing apparatus of Embodiment 4 according to an aspect of the present invention. For example, the color image compressing procedure is carried out in response to the handling of users who need the compression of color image.

One color image is transferred from the HDD 75 via the DMA unit 76, and stored in the RAM 72. The CPU 70 then generates the foreground image mask representing all the pixels of foreground, each of which expresses a text and/or a line drawing of the color image stored in the RAM 72, for example, with the use of the method disclosed by the Japanese Patent No. 3779741. Thus, the CPU 70 generates one foreground image mask based on one color image (S51). The generated foreground image mask is transferred to the HDD 75 via the DMA unit 76, and stored in the HDD 75.

In other words, the CPU 70 functions as a foreground image mask generating means, at the process of S51.

Then, the CPU 70 generates an IC table and a foreground image layer, based on one foreground image mask generated at S51 and one color image (S52). Thus, the foreground image mask and the color image are transferred from the HDD 75 via the DMA unit 76, and stored in the RAM 72. The CPU 70 then generates the IC table and the foreground image layer, based on the foreground image mask and the color image stored in the RAM 72, for example, with the use of methods disclosed by the Japanese Patent Application Laid-Open No. 2002-94805 and No. 2004-229261. The generated IC table is stored in the RAM 72.

In other words, the CPU 70 functions as a table generating means and a foreground image layer generating means, as S52.

The CPU 70 requests to the DMA unit 76 about the transfer of the foreground image layer generated at S52 to the HDD 75 (S53). Thus, the foreground image layer is transferred to the HDD 75 via the DMA unit 76, and written on the HDD 75.

The foreground image mask and the color image are transferred from the HDD 75 via the DMA unit 76, and stored into the RAM 72. The CPU 70 then generates the background image layer, based on the foreground image mask and the color image stored in the RAM 72, for example with the use of methods disclosed by the Japanese Patent Application Laid-Open No. 2002-94805 and No. 2004-229261. Thus, the CPU 70 generates a background image layer, based on the foreground image mask generated at S51 and the color image (S54). The generated background image layer is transferred to the HDD 75 via the DMA unit 76, and stored in the HDD 75.

Furthermore, the CPU 70 calls subroutines for first binary image generating process and second binary image generating process (see FIGS. 22 and 23), and carries out these two processes simultaneously, i.e., multitask (S55). The binary image generating process at S55 generates β binary images separated from one color image.

β binary images are transferred from the HDD 75 via the DMA unit 76, and stored in the RAM 72. The CPU 70 then generates β compressed images through respectively compressing β binary images stored in the RAM 72, with the use of a known lossless compression technique. Thus, the CPU 70 respectively compresses β binary images generated at S55 (S56). The β compressed images are transferred to the HDD 75 via the DMA unit 76, and stored in the HDD 75.

In other words, the CPU 70 functions as a binary image compressing means, at S56.

The background image layer is transferred from the HDD 75 via the DMA unit 76, and stored in the RAM 72. The CPU 70 then compresses the background image layer stored in the RAM 72, with the use of a known lossy compression technique. Thus, the CPU 70 further compresses the background image layer generated at S54 (S57). The compressed background image layer is transferred to the HDD 75 via the DMA unit 76, and stored in the HDD 75.

The CPU 70 further compresses the IC table generated at S52 (S58), and generates one compressed file by putting the compressed IC table, D compressed images stored in the HDD 75, and the compressed background image layer together (S59). The generated compressed file is stored in the HDD 75, and then the color image compressing procedure is completed.

Figure 22:
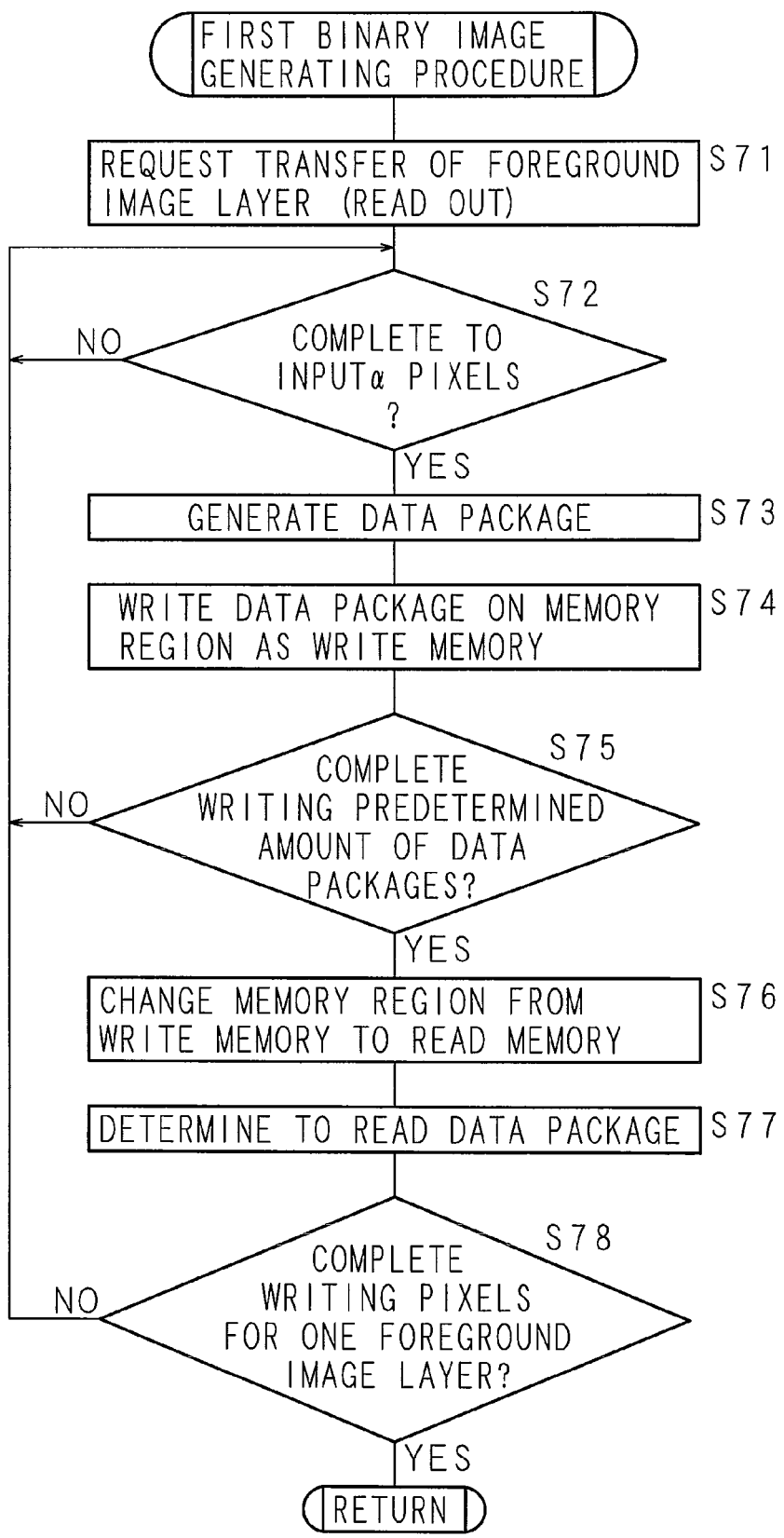
FIG. 22 is a flowchart showing a subroutine of a first binary image generating procedure carried out by the image compressing apparatus of Embodiment 4 according to an aspect of the present invention.
Figure 23:
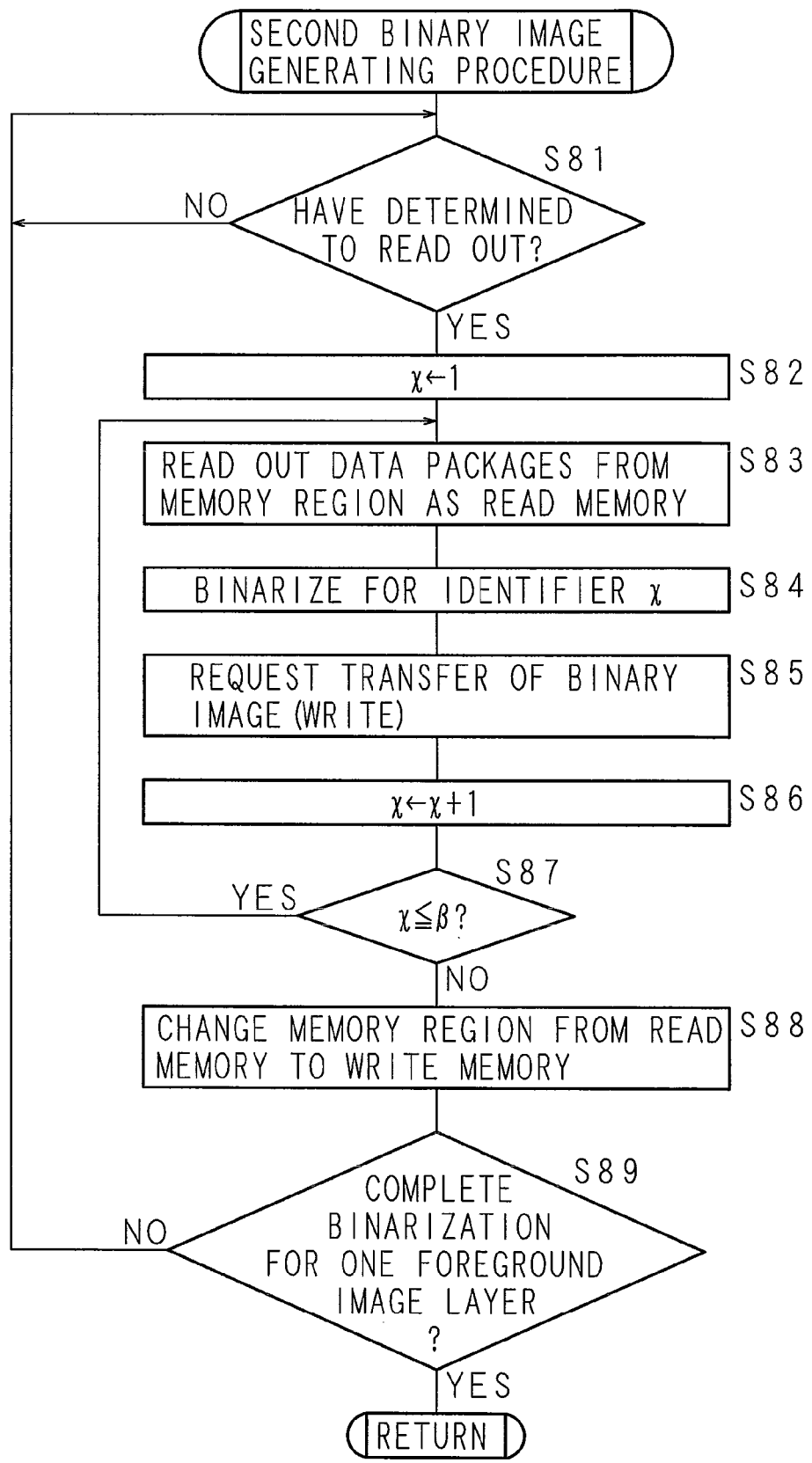
FIG. 23 is a flowchart showing a subroutine of a second binary image generating procedure carried out by the image compressing apparatus of Embodiment 4 according to an aspect of the present invention.

FIGS. 22 and 23 are flowcharts showing subroutines of the first and second binary image generating procedures carried out by the image compressing apparatus of Embodiment 4 according to an aspect of the present invention.

Firstly, it will be explained about the first binary image generating procedure of CPU 70. For purpose of illustration, it will be explained about the case that both of memory regions 721, 722 are as write memory before the first binary image generating procedure is carried out.

When having started to carry out the first binary image generating procedure shown in FIG. 22, the CPU 70 requests to the DMA unit 76 about the transfer of one foreground image layer (e.g., the foreground image layer shown in FIG. 6) (S71). In other words, the CPU 70 functions as a transmission request means, at S71.

The foreground image layer read out from the HDD 75 is transferred into the RAM 72 via the DMA unit 76.

The CPU 70 determines whether it has been completed to input α pixels of the foreground image layer transferred from the HDD 75, or not (S72). When it has been not completed to input α pixels yet (S72: NO), the CPU 70 repeats the process of S72.

When it has been completed to input α pixels of the foreground image layer transferred from the HDD 75 (S72: YES), the CPU 70 generates a data package by packing the inputted α pixels (S73), and then writes the generated data package on the memory region 721 as write memory (S74). In short, the CPU 70 functions as a packing means, at S73 and 74.

The CPU 70 writes a data package at S74, every time α pixels are inputted. In other words, the data package is written on write memory, at a write interval that is α times longer than the input interval for inputting a pixel.

After S74, the CPU 70 determines whether it has been completed to write, on the memory region 721 for wrote memory, predetermined amount of data packages (e.g., data packages for one line or for one block), or not (S75). When it has not been completed to write (S75: NO), the CPU 70 repeats the process of S72.

When it has been completed to write, on the memory region 721 for wrote memory, predetermined amount of data packages (S75: YES), the CPU 70 changes the function of the memory region 721 from write memory to read memory (S76). Then, the CPU 70 determines to read data packages from the memory region 721 as read memory (S77).

After S77, the CPU 70 determines whether it has been completed to write on the memory regions 721, 722 the pixels for one foreground image layer, or not (S78). When it has not been completed to write (S78: NO), the CPU 70 repeats the process of S72. Then, the CPU 70 carries out processes from S72 onward, against the memory region 722 as write memory.

Next, it will be explained about the second binary image generating procedure of CPU 70.

When having started to carry out the second binary image generating procedure shown in FIG. 23, the CPU 70 determines whether it has been determined at S76 of the first binary image generating procedure, to read out data packages from the memory region 721 as read memory, or not (S81). When it has not been determined at S76 yet (S81: NO), the CPU 70 repeats the process of S81.

When it has been determined to read out data packages from the memory region 721 as read memory (S81: YES), the CPU 70 sets "1" to a parameter "χ" (S82), and reads out the predetermined amount of data packages from the memory region 721 as read memory (S83). At S83, the data packages are read out at read intervals that are the same as the input intervals for inputting pixels.

The CPU 70 is carrying out the first binary image generating procedure, in parallel with carrying out the second binary image generating procedure to read out data packages from the memory region 721 as read memory at read intervals that are the same as the input intervals. Therefore, the data packages are written on the memory region 722 as write memory at write intervals that are α times longer than the input intervals. In other words, the CPU 70 is reading out, with writing, the data packages for two memory regions 721, 722. Thus, the CPU 70 functions as a memory controlling means at S74 and 83.

The CPU 70 generates a binary image by binarizing with pixel values of identifier χ and pixel values of the remaining identifiers, in accordance with the foreground image layer for the predetermined amount based on the data packages read out from the memory region 722 as read memory (S84).

The CPU 70 requests to the DMA unit 76 about the transfer of binary image corresponding to the identifier χ that is generated for the predetermined amount at S84 (S85), and outputs the binary image for the predetermined amount to the DMA unit 76.

The binary image for the predetermined amount corresponding to the identifier χ is transferred to the HDD 75 via the DMA unit 76, and then stored in the memory region that should store the binary image for the predetermined amount corresponding to the identifier χ.

Then, the CPU 70 increments "1" to the parameter "χ" (S86), and determines whether the parameter "χ" is not more than "β" representing the number of types of the identifier, or not (S87). When the "χ" is not more than "β" (S87: YES), the CPU 70 repeats the process of S83. In short, the CPU 70 functions as a binary image generating means, at S84.

When the "χ" is more than "β" (S87: NO), the CPU 70 changes the function of the memory region 721 from read memory to write memory (S88). Then, the CPU 70 determines whether it has been completed to binarize pixels for one foreground image layer (S89). When it has not been completed to binarize yet (S89: NO), the CPU 70 repeats the process of S81. Then, the CPU 70 carries out processes from S81 onward, for the memory region 722 as read memory.

When it has been completed to write on the memory regions 721, 722 the pixels for one foreground image layer (S78: YES) and to binarize pixels for one foreground image layer (S89: YES), the CPU 70 stops the first and the second binary image generating procedures, and carries back to the processes of main routine.

Thus, the CPU 70 functions as a memory controlling means, at S76 and S88.

As described above, such image compressing apparatus 7 packs α pixels into one data package, and writes data packages on the memory region 721 or the memory region 722 as write memory at the write intervals that are α times longer than the input intervals about inputting a pixel. In parallel with writing the data package, the image compressing apparatus 7 reads out a package data β times for β types of the identifier from the memory region 722 or memory region 721 as read memory, at read intervals that are the same as the input intervals. Therefore, these configurations lead advantages to output β binary images every time one foreground image layer is inputted, without changing clock rates to be β times faster.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method with an image processing apparatus having a memory, comprising the steps of:
   accepting an image;
   generating a data package by packing pixels of the accepted image at an input interval, wherein one data package consists of α pixels, the α being a positive integer greater than 1;
   storing the generated data package in the memory; and
   reading out the data package stored in the memory,
   wherein
   one data package generated by packing is stored in a first memory region of the memory, at a store interval that is α times longer than the input interval;
   the "one data package" stored in the first memory region is read out at a read interval that is the same as the input interval;
   during reading out the "one data package" stored in the first memory region, another data package generated by packing is stored in a second memory region of the memory at the store interval;
   the "another data package" stored in the second memory region is read out at the read interval; and
   during reading out the "another data package" stored in the second memory region, other data package generated by packing is stored in the first memory region at the store interval.

2. An image processing method according to claim 1, further comprising the steps of:
   generating a foreground image mask based on the accepted image, wherein the foreground image mask represents pixels about text and/or line drawing of the accepted image;
   generating a table based on the generated foreground image mask and the accepted image, wherein the table associates color information corresponding to the text and/or the line drawing, with β types of identifier, the β being a positive integer, that identify the color information;
   generating a foreground image layer based on the table, the foreground image mask, and the accepted image, wherein the color information is converted to the β types of identifier in the foreground image layer;
   generating binary images based on the generated foreground image layer, wherein the binary images are made for each identifier of β types into a pixel value corresponding to one of β types of identifier and the other pixel values except one of β types of identifier; and
   compressing each of the generated binary images,
   wherein
   the pixels that are packed for generating the data package are pixels of the generated foreground image layer;
   a relationship between the α and β is: α>β or α=β; and
   total number of times for reading out about data package is β.

3. An image processing apparatus, comprising:
an accepting unit that accepts an image;
a packing unit that packs, at an input interval, pixels of the image accepted by the accepting unit, wherein one data package consists of α pixels, the α being a positive integer greater than 1;
a memory that has a first memory region and a second memory region, and stores the data package generated by the packing unit; and
a control unit that controls the data package in the memory, wherein
the control unit stores, in the first memory region, one data package generated by the packing unit, at a store interval that is α times longer than the input interval;
the control unit reads out the "one data package" stored in the first memory region at a read interval that is the same as the input interval;
during reading out the "one data package" stored in the first memory region, the control unit stores, in the second memory region at the store interval, another data package generated by the packing unit;
the control unit reads out the "another data package" stored in the second memory region at the read interval; and
during reading out the "another data package" stored in the second memory region, the control unit stores, in the first memory region at the store interval, other data package generated by the packing unit.

4. An image processing apparatus according to claim 3, further comprising:
a foreground image mask generating unit that generates a foreground image mask representing pixels about text and/or line drawing of the image accepted by the accepting unit;
a table generating unit that generates a table based on the foreground image mask generated by the foreground image mask generating unit and the image accepted by the accepting unit, wherein the table associates color information corresponding to the text and/or the line drawing, with β types of identifier, the β being a positive integer, that identify the color information;
a foreground image layer generating unit that generates foreground image layer based on the table generated by the table generating unit and the foreground image mask generated by the foreground image mask generating unit, wherein the color information is converted to the β types of identifier in the foreground image layer;
a binary image generating unit that generates binary images based on the foreground image layer generated by the foreground image layer generating unit, wherein the binary images are made for each identifier of β types into a pixel value corresponding to one of β types of identifier and the other pixel values except one of β types of identifier; and
a binary image compressing unit that compresses each of the binary images generated by the binary image generating unit,
wherein
the pixels packed by the packing unit are pixels based on the foreground image layer generated by the foreground image layer generating unit;
a relationship between the α and β is: α>β or α=β; and
total number of times for reading out processes controlled by the control unit is β.

5. An image processing apparatus according to claim 4, wherein
the first memory region, as well as the second memory region, consists of a line memory;
the control unit repeats β times the process of reading out, at the read interval, one line part of the data package packed by the packing unit, from the line memory that has stored the one line part; and
the binary image generating unit performs, β times for the β types of identifier, a generation process to generate a binary image, which is for the one line part.

6. A recording medium having stored thereon computer executable program for processing data, the computer program when executed causes a computer system to execute steps of:
generating a data package by packing, at an input interval, pixels of an accepted image, wherein one data package consists of α pixels, the α being a positive integer greater than 1;
storing the generated data package in a memory; and
reading out the data package stored in the memory,
wherein
one data package generated by packing is stored in a first memory region of the memory, at a store interval that is α times longer than the input interval;
the "one data package" stored in the first memory region is read out at a read interval that is the same as the input interval;
during reading out the "one data package" stored in the first memory region, another data package generated by packing is stored in a second memory region of the memory at the store interval;
the "another data package" stored in the second memory region is read out at the read interval; and
during reading out the "another data package" stored in the second memory region, other data package generated by packing is stored in the first memory region at the store interval.

7. A recording medium according to claim 6, wherein the computer program when executed causes a computer system to execute further steps of:
generating a foreground image mask based on the accepted image, wherein the foreground image mask represents pixels about text and/or line drawing of the accepted image;
generating a table based on the generated foreground image mask and the accepted image, wherein the table associates color information corresponding to the text and/or the line drawing, with β types of identifier, the β being a positive integer, that identify the color information;
generating a foreground image layer based on the table and the foreground image mask, wherein the color information is converted to the β types of identifier in the foreground image layer;
generating binary images based on the foreground image layer, wherein the binary images are made for each identifier of β types into a pixel value corresponding to one of β types of identifier and the other pixel values except one of β types of identifier; and
compressing each of the generated binary images,
wherein
the pixels that are packed for generating the packed image are pixels of the generated foreground image layer;
a relationship between the α and β is: α>β or α=β and
total number of times for reading out about data package is β.

* * * * *